US009405424B2

(12) United States Patent
Wolfram et al.

(10) Patent No.: US 9,405,424 B2
(45) Date of Patent: Aug. 2, 2016

(54) METHOD AND SYSTEM FOR DISTRIBUTING AND DISPLAYING GRAPHICAL ITEMS

(75) Inventors: Stephen Wolfram, Champaign, IL (US); Jeremy Davis, Mahomet, IL (US)

(73) Assignee: WOLFRAM ALPHA, LLC, Champaign, IL (US)

( * ) Notice: Subject to any disclaimer, the term of this patent is extended or adjusted under 35 U.S.C. 154(b) by 273 days.

(21) Appl. No.: 13/598,593

(22) Filed: Aug. 29, 2012

(65) Prior Publication Data

US 2014/0068449 A1 Mar. 6, 2014

(51) Int. Cl.
*G06F 3/0485* (2013.01)
*G06Q 30/00* (2012.01)
*G06F 3/048* (2013.01)

(52) U.S. Cl.
CPC ..................................... *G06F 3/048* (2013.01)

(58) Field of Classification Search
CPC ... G06F 3/0481; G06F 9/4443; G06F 3/0485; G06Q 30/00
USPC .............. 715/738, 747, 863; 705/14.4, 14.49, 705/14.51, 14.53, 14.66, 14.67, 14.73, 705/26.1; 725/46
See application file for complete search history.

(56) References Cited

U.S. PATENT DOCUMENTS

| | | |
|---|---|---|
| 4,734,854 A | 3/1988 | Afshar |
| 4,740,886 A | 4/1988 | Tanifuji et al. |
| 4,841,441 A | 6/1989 | Nixon et al. |
| 4,949,253 A | 8/1990 | Chigira et al. |
| 5,038,296 A | 8/1991 | Sano |
| 5,315,710 A | 5/1994 | Kishimoto et al. |
| 5,394,509 A | 2/1995 | Winston |
| 5,448,740 A | 9/1995 | Kiri et al. |
| 5,485,601 A | 1/1996 | Ching |
| 5,499,371 A | 3/1996 | Henninger et al. |
| 5,555,367 A | 9/1996 | Premerlani et al. |
| 5,559,939 A | 9/1996 | Wada et al. |
| 5,634,024 A | 5/1997 | Yamaguchi |
| 5,640,576 A | 6/1997 | Kobayashi et al. |
| 5,696,962 A | 12/1997 | Kupiec |

(Continued)

FOREIGN PATENT DOCUMENTS

| | | |
|---|---|---|
| EP | 0 442 240 A2 | 8/1991 |
| WO | WO-97/40425 A2 | 10/1997 |

(Continued)

OTHER PUBLICATIONS

"AppleScript," Wikipedia, 1993.

(Continued)

*Primary Examiner* — Jennifer To
*Assistant Examiner* — Jasmine Wan

(57) ABSTRACT

A subset of graphical display items, in a set of graphical display items stored in the one or more electronic storage devices, that have not previously been viewed by a user is determined. A graphical display item is selected from a subset of graphical display items. The graphical display item may be selected according to an order, or selected randomly. An initial display item and the selected graphical display item are electronically transmitted to a user computing device. The initial display item and the selected graphical display item are configured such that the selected graphical display item is displayed on a display device of the user computing device in response to the user selecting the initial display item when the initial display item is displayed on the display device.

57 Claims, 8 Drawing Sheets

(56) References Cited

U.S. PATENT DOCUMENTS

| | | | |
|---|---|---|---|
| 5,768,590 A | 6/1998 | Kimura et al. | |
| 5,815,713 A | 9/1998 | Sanders | |
| 5,815,717 A | 9/1998 | Stack | |
| 5,987,505 A | 11/1999 | Fry et al. | |
| 6,038,560 A | 3/2000 | Wical | |
| 6,076,051 A | 6/2000 | Messerly et al. | |
| 6,084,585 A | 7/2000 | Kraft et al. | |
| 6,169,986 B1 | 1/2001 | Bowman et al. | |
| 6,173,441 B1 | 1/2001 | Klein | |
| 6,216,139 B1 | 4/2001 | Listou | |
| 6,256,665 B1 | 7/2001 | Fry et al. | |
| 6,275,976 B1 | 8/2001 | Scandura | |
| 6,289,513 B1 | 9/2001 | Bentwich | |
| 6,493,694 B1 | 12/2002 | Xu et al. | |
| 6,502,236 B1 | 12/2002 | Allen et al. | |
| 6,505,157 B1 | 1/2003 | Elworthy | |
| 6,584,464 B1 | 6/2003 | Warthen | |
| 6,589,290 B1 | 7/2003 | Maxwell et al. | |
| 6,675,159 B1 | 1/2004 | Lin et al. | |
| 6,684,388 B1 | 1/2004 | Gupta et al. | |
| 6,704,728 B1 | 3/2004 | Chang et al. | |
| 6,742,162 B2 | 5/2004 | Bennett | |
| 6,853,868 B1* | 2/2005 | Albers et al. | 700/94 |
| 6,876,314 B1 | 4/2005 | Lin | |
| 6,877,155 B1 | 4/2005 | Lindsey | |
| 6,901,399 B1 | 5/2005 | Corston et al. | |
| 6,973,640 B2 | 12/2005 | Little et al. | |
| 6,996,801 B2 | 2/2006 | Yoneyama | |
| 7,043,415 B1* | 5/2006 | Dunlavey et al. | 703/12 |
| 7,096,271 B1* | 8/2006 | Omoigui et al. | 709/231 |
| 7,120,574 B2 | 10/2006 | Troyanova et al. | |
| 7,137,100 B2 | 11/2006 | Iborra et al. | |
| 7,197,739 B2 | 3/2007 | Preston et al. | |
| 7,222,333 B1 | 5/2007 | Mor et al. | |
| 7,263,517 B2 | 8/2007 | Sheu et al. | |
| 7,269,822 B2 | 9/2007 | Gebhart et al. | |
| 7,373,291 B2 | 5/2008 | Garst | |
| 7,440,968 B1 | 10/2008 | Oztekin et al. | |
| 7,451,135 B2 | 11/2008 | Goldman et al. | |
| 7,454,701 B2 | 11/2008 | Graeber | |
| 7,613,676 B2 | 11/2009 | Baisley et al. | |
| 7,620,935 B2 | 11/2009 | Baisley et al. | |
| 7,685,507 B2 | 3/2010 | Workman et al. | |
| 7,747,601 B2 | 6/2010 | Cooper et al. | |
| 7,774,708 B2* | 8/2010 | Bell et al. | 715/738 |
| 7,844,594 B1 | 11/2010 | Holt et al. | |
| 8,091,024 B2 | 1/2012 | Graeber | |
| 8,135,696 B2 | 3/2012 | Safoutin | |
| 8,310,443 B1* | 11/2012 | Pan | 345/156 |
| 8,446,465 B2* | 5/2013 | Ambor et al. | 348/65 |
| 2002/0049635 A1* | 4/2002 | Mai et al. | 705/14 |
| 2002/0099743 A1 | 7/2002 | Workman et al. | |
| 2002/0116176 A1 | 8/2002 | Tsourikov et al. | |
| 2002/0140734 A1 | 10/2002 | Bennett | |
| 2002/0143810 A1 | 10/2002 | Bennett | |
| 2002/0174120 A1 | 11/2002 | Zhang et al. | |
| 2003/0140342 A1* | 7/2003 | Hasebe et al. | 725/46 |
| 2003/0145022 A1 | 7/2003 | Dingley | |
| 2003/0191765 A1 | 10/2003 | Bargh et al. | |
| 2004/0001109 A1 | 1/2004 | Blancett et al. | |
| 2004/0049499 A1 | 3/2004 | Nomoto et al. | |
| 2004/0088158 A1 | 5/2004 | Sheu et al. | |
| 2004/0103405 A1 | 5/2004 | Vargas | |
| 2004/0128649 A1 | 7/2004 | Grundy et al. | |
| 2004/0199428 A1* | 10/2004 | Silverbrook et al. | 705/16 |
| 2004/0268451 A1* | 12/2004 | Robbin et al. | 999/999.999 |
| 2005/0005258 A1 | 1/2005 | Bhogal et al. | |
| 2005/0080780 A1 | 4/2005 | Colledge et al. | |
| 2005/0081252 A1* | 4/2005 | Chefalas et al. | 725/135 |
| 2005/0097464 A1 | 5/2005 | Graeber | |
| 2006/0020886 A1 | 1/2006 | Agrawal et al. | |
| 2006/0025987 A1 | 2/2006 | Baisley et al. | |
| 2006/0026576 A1 | 2/2006 | Baisley et al. | |
| 2006/0136411 A1 | 6/2006 | Meyerzon et al. | |
| 2006/0271908 A1 | 11/2006 | Bargh et al. | |
| 2006/0279799 A1 | 12/2006 | Goldman | |
| 2007/0022109 A1 | 1/2007 | Imielinski et al. | |
| 2007/0043574 A1 | 2/2007 | Coffman et al. | |
| 2007/0106657 A1 | 5/2007 | Brzeski et al. | |
| 2007/0203929 A1 | 8/2007 | Bolivar | |
| 2007/0208722 A1 | 9/2007 | Dettinger et al. | |
| 2007/0220034 A1 | 9/2007 | Iyer et al. | |
| 2008/0016040 A1 | 1/2008 | Jones et al. | |
| 2008/0066052 A1 | 3/2008 | Wolfram | |
| 2008/0092058 A1* | 4/2008 | Afergan et al. | 715/745 |
| 2008/0168404 A1* | 7/2008 | Ording | G06F 3/0485 715/863 |
| 2009/0055733 A1 | 2/2009 | Graeber | |
| 2009/0171923 A1 | 7/2009 | Nash et al. | |
| 2010/0004924 A1 | 1/2010 | Paez | |
| 2010/0027832 A1* | 2/2010 | Koseki | 381/387 |
| 2010/0031162 A1* | 2/2010 | Wiser et al. | 715/747 |
| 2010/0050098 A1* | 2/2010 | Turner | 715/763 |
| 2010/0153836 A1* | 6/2010 | Krassner et al. | 715/234 |
| 2010/0153867 A1* | 6/2010 | Scott et al. | 715/762 |
| 2010/0179886 A1* | 7/2010 | Lee | 705/27 |
| 2010/0228592 A1* | 9/2010 | Anderson | G06Q 30/00 705/14.54 |
| 2010/0268584 A1* | 10/2010 | Pullur et al. | 705/14.16 |
| 2010/0293174 A1 | 11/2010 | Bennett et al. | |
| 2012/0060117 A1* | 3/2012 | Bok et al. | 715/810 |
| 2013/0097011 A1* | 4/2013 | Wang et al. | 705/14.45 |

FOREIGN PATENT DOCUMENTS

| | | | |
|---|---|---|---|
| WO | WO-2006/014892 A2 | 2/2006 | |
| WO | WO-2006/015006 A2 | 2/2006 | |

OTHER PUBLICATIONS

"Area calculator," http://www.calculator.com, 1 page, Aug. 15, 2006.

"calculator.com", http://www.calculator.com, 2 pages, Aug. 15, 2006.

"Car Lease Calculator", http://www.calculator.com, 1 page, Aug. 15, 2006.

"Currency Calculator", http://www.calculator.com, 1 page, Aug. 15, 2006.

"Fractions calculator", http://www.calculator.com, 1 page, Aug. 15, 2006.

"General Loan Calculator", http://www.calculator.com, 1 page, Aug. 15, 2006.

"Google Code," http://code.google.com, Mar. 17, 2005, p. 1-11.

"Graphing calculator", http://www.calculator.com, 1 page, Aug. 15, 2006.

"Home—Finance", http://www.calculator.com, 2 pages, Aug. 15, 2006.

"Home Equity Calculator", http://www.calculator.com, 1 page, Aug. 15, 2006.

"How Much Can I Afford Calculator", http://www.calculator.com, 1 page, Aug. 15, 2006.

"Length Adding Calculator", http://www.calculator.com, 1 page, Aug. 15, 2006.

"Love Calculator", http://www.calculator.com 1 page, Aug. 15, 2006.

"Mortgage Payment Calculator", http://www.calculator.com, 1 page, Aug. 15, 2006.

"Mortgage Qualification Calculator", http://www.calculator.com, 1 page, Aug. 15, 2006.

"Percent calculator", http://www.calculator.com, 1 page, Aug. 15, 2006.

"Rent versus Buy Calculator", http://www.calculator.com, 1 page, Aug. 15, 2006.

"Scientific calculator", http://www.calculator.com, 1 page, Aug. 15, 2006.

"Standard calculator", http://www.calculator.com, 1 page, Aug. 15, 2006.

"Temperature calculator", http://www.calculator.com 1 page, Aug. 15, 2006.

"The Mortgage Calculator," http://www.hughchou.org/calc/mortold.html, Aug. 8, 1996, p. 1-7.

(56) References Cited

OTHER PUBLICATIONS

"Time Calculator", http://www.calculator.com 1 page, Aug. 15, 2006.

"Unit Conversion Calculator", http://www.calculator.com 1 page, Aug. 15, 2006.

Adorni, et al., "Natural Language Input for Scene Generation," Proceedings of the first conference on European Chapter of the Association for Computational Linguistics, pp. 175-182 (1983).

Asperti et al., "A content based mathematical search engine: Whelp," 2004, p. 1-15.

Estival et al., "Towards Ontology-Based Natural Language Processing," http://acl.ldc.upenn.edu/acl2004/nlpxml/pdf/estival-etal.pdf, accessed Mar. 8, 2010, 8 pages.

Kamareddine et al., "Restoring Natural Language as a Computerized Mathematics Input Method," Proceedings of the 14th symposium on Towards Mechanized +Mathematical Assistants: 6th International Conference, pp. 280-295 (2007).

Ko et al., "The State of the Art in End-User Software Engineering," accepted for publication in ACM Computing Surveys, vol. 43, No. 3, Article 21, publication date: Apr. 2011.

Lavrov, "Program Synthesis," Cybernetics and Systems Analysis, vol. 18, No. 6 pp. 708-715 (Nov. 1982).

Meyers, A., "VOX—An Extensible Natural Language Processor," http://dli.iiit.ac.in/ijcai/IJCA1-85-VOL2/PDF/026.pdf, accessed Mar. 8, 2010, 5 pages.

Moore, Gregory M., "Calculator Code: Programming Code for Use within a Scientific Calculator," Fall 2005, p. 1-29.

Myers et al., "Natural Programming Languages and Environments," Communications of the ACM, vol. 47, No. 9, pp. 47-52 (Sep. 2004).

Office Action for related U.S. Appl. No. 12/780,685, dated Feb. 15, 2012.

Office Action for related U.S. Appl. No. 12/780,705, dated Jan. 31, 2012.

Osogami, "A Study of Input and Output Conditions for Automatic Program Generation," Memoirs of the Fukui Institute of Technology, vol. 37 pp. 273-278 (2007).

Sucan, Ioan Alexandru, "A Search Engine for Mathematical Formulae," May 7, 2006, p. 1-17.

Trott, Michael, "Mathematical Searching of the Wolfram Functions Site," 2005, The Mathematica Journal, p. 713-726.

Trott, Michael, "The Functions Website," 2003, The Mathematical Journal, p. 1-10.

Wang et al., "Mining Term Association Patterns from Search Logs for Effective Query Reformulation," ACM CIKM 2008, Oct. 26-30, 2008, pp. 479-488.

\* cited by examiner

METHOD AND SYSTEM FOR DISTRIBUTING AND DISPLAYING GRAPHICAL ITEMS

BACKGROUND

Advertisements have become increasingly important on computing devices, both for providing revenue and for providing information in a manner that will not drive users away. Various attempts have been made to improve the effectiveness of advertising and to make the advertising not overly intrusive but still effective for the advertisers.

For Internet-based content, advertisements have the ability to make a web site profitable but too many advertisements may drive users away. Users can become annoyed if too many advertisements interfere with the experience. In addition, users have become more skilled at avoiding or ignoring advertisements by utilizing applications such as pop-up blockers and modifying web browser configurations to minimize advertisements.

SUMMARY OF THE DISCLOSURE

Systems and methods disclosed herein generally relate to providing information, such as advertising or other suitable information, in an entertaining manner. The provided information may include graphical display items to be displayed on display devices of computers. The graphical display items may be or serve as advertisements for goods and/or services, in some embodiments. In other embodiments, the graphical display items may provide other suitable types of information. Different but related graphical display items may be displayed on the display device at different times to increase the entertainment value of the graphical display items, in an embodiment. For example, the different graphical display items may, over time, tell an engaging story, in an embodiment. As another example, the different graphical display items may appear seemingly random to a user and offer an engaging level of surprise, in an embodiment. Each graphical display item may be displayed in response to a user action, such as by selecting, (e.g., "rolling over," etc.), a related initial display item, in an embodiment. The related initial display item may be smaller in relation to the graphical display item in order to be unobtrusive and to reduce annoyance to the user, in an embodiment. Thus, in some embodiments, the graphical display item is displayed when initiated by the user such as when the user explicitly chooses to view the graphical display item. The user may be motivated to choose to display the graphical display item because of an engaging story and/or an element of surprise or suspense, etc., provided by different graphical display items over time.

In other embodiments, the provided information additionally or alternatively may include audio items to be rendered by audio output devices of computers. Similar to the graphical display items described above, the audio items may be or serve as advertisements for goods and/or services, in some embodiments. In other embodiments, the audio items may provide other suitable types of information. In some embodiments, the audio items may include songs from an artist, spoken compositions from an author, a celebrity, etc. Different but related audio items may be rendered at different times to increase the entertainment value of the audio items, in an embodiment. For example, the different audio items may, over time, tell an engaging story, in an embodiment. As another example, the different audio items may appear seemingly random to a user and offer an engaging level of surprise, in an embodiment. As another example, the audio items may include new songs from an artist. Each audio item may be rendered in response to a user action, such as by selecting, (e.g., "rolling over," etc.), a related initial display item, in an embodiment. Thus, in some embodiments, the audio item is rendered when initiated by the user such as when the user explicitly chooses to listen to the audio item. The user may be motivated to listen to an audio item because of an engaging story, an element of surprise or suspense, etc., provided by different audio items over time.

In one embodiment, a method includes determining, with a computing system, a subset of graphical display items, in a set of graphical display items, that have not previously been viewed by a user, and selecting, with the computing system, a graphical display item from the subset of graphical display items. The set of graphical display items are stored in one or more electronic storage devices of the computing system. The graphical display item may be selected according to an order, or selected randomly. The method also includes electronically transmitting, with the computing system and via a communication network, an initial display item to a user computing device, the initial display item configured to be displayed on a display device of the user computing device by an application executed by a processor of the user computing device. The method additionally includes electronically transmitting, with the computing system and via the communication network, the selected graphical display item to the user computing device. The initial display item and the selected graphical display item are configured such that the selected graphical display item is displayed on the display device of the user computing device by the application in response to the user selecting the initial display item when the initial display item is displayed on the display device.

In another embodiment, a computing system comprises a network interface configured to be communicatively coupled to a communication network. Additionally, the computing system comprises one or more processors, and one or more electronic storage devices coupled to the one or more processors. The one or more electronic storage devices store computer readable instructions that, when executed by the one or more processors, cause the one or more processors to: determine a subset of graphical display items, in a set of graphical display items stored in the one or more electronic storage devices, that have not previously been viewed by a user; select a graphical display item from the subset of graphical display items, cause the network interface to transmit an initial display item to a user computing device via the communication network, wherein the initial display item is configured to be displayed on a display device of the user computing device by an application executed by a processor of the user computing device, and cause the network interface to transmit the selected graphical display item to the user computing device via the communication network. The initial display item and the selected graphical display item are configured such that the selected graphical display item is displayed on the display device of the user computing device by the application in response to the user selecting the initial display item when the initial display item is displayed on the display device.

In another embodiment, one or more first electronic storage devices having stored thereon computer readable instructions that, when executed by one or more processors, cause the one or more processors to: determine a subset of graphical display items, in a set of graphical display items stored in the one or more second electronic storage devices, that have not previously been viewed by a user; select a graphical display item from the subset of graphical display items; cause a network interface of the computing system to electronically transmit, via a communication network, an initial display item to a user computing device, the initial display item configured to be displayed on a display device of the user computing device by an application executed by a processor of the user computing device; and cause the network interface of the computing system to electronically transmit, via the communication network, the selected graphical display item to the user computing device. The initial display item and the selected graphical display item are configured such that the selected graphical display item is displayed on the display device of the user computing device by the application in response to the user selecting the initial display item when the initial display item is displayed on the display device.

DETAILED DESCRIPTION

Figure 1:
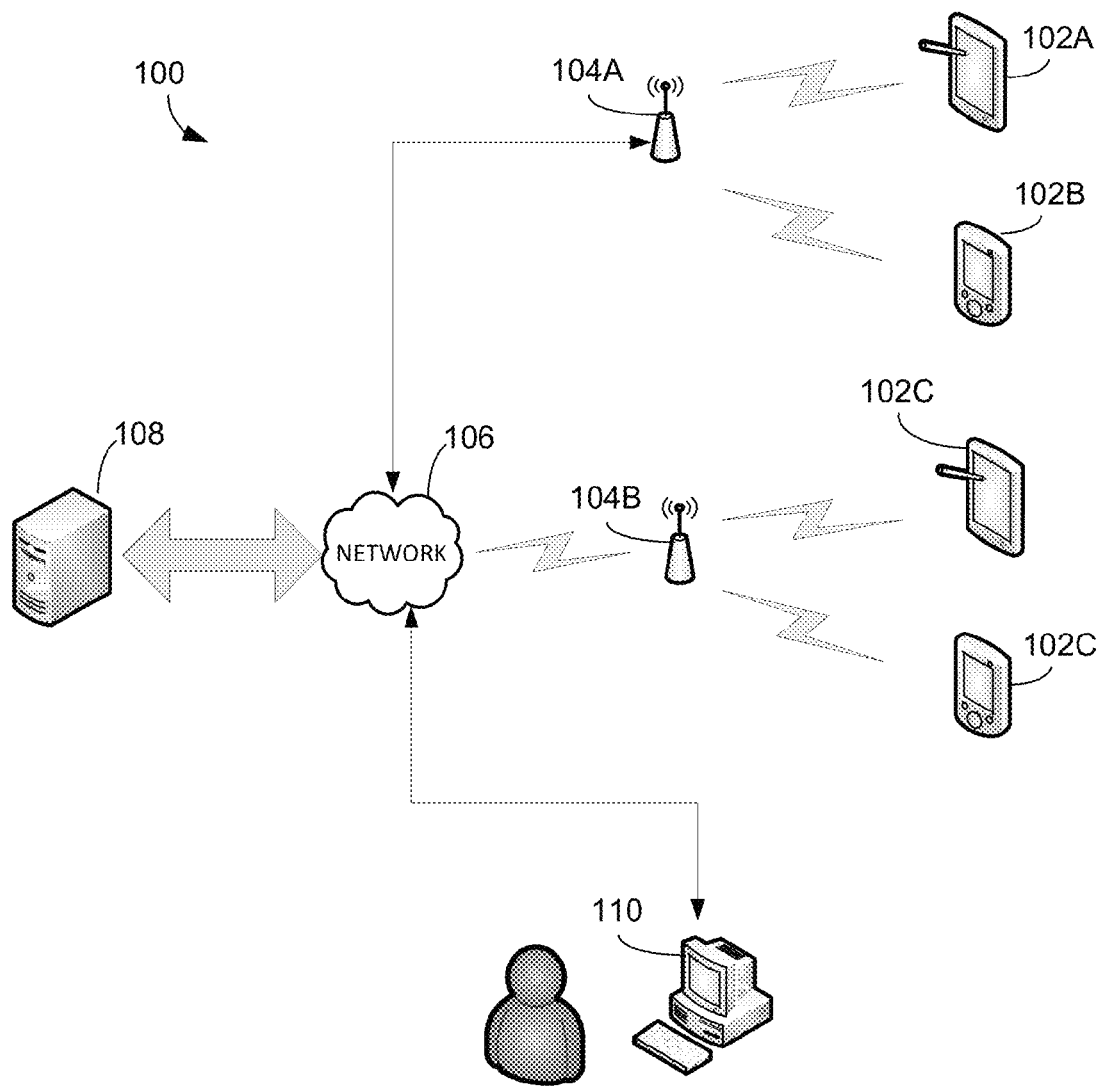
FIG. 1 is block diagram of an example system for delivering information in an entertaining manner, according to an embodiment.

FIG. 1 is a diagram of an example system 100 for providing information, such as advertising or other suitable information, in an entertaining manner, according to an embodiment. The provided information may include graphical display items to be displayed on display devices of computers. The graphical display items may be or serve as advertisements for goods and/or services, in an embodiment. In other embodiments, the graphical display items may provide other suitable types of information. Different but related graphical display items may be displayed on the display device at different times to increase the entertainment value of the graphical display items, in an embodiment. For example, the different graphical display items may, over time, tell an engaging story, in an embodiment. As another example, the different graphical display items may appear seemingly random to a user and offer an engaging level of surprise, in an embodiment. Each graphical display item may be displayed in response to a user action, such as by "rolling over," selecting, etc., a related initial display item, in an embodiment. The related initial display item may be smaller in relation to the graphical display item in order to be unobtrusive and to reduce annoyance to the user, in an embodiment. Thus, in an embodiment, the graphical display item is displayed when initiated by the user such as when the user explicitly chooses to view the graphical display item. The user may be motivated to choose to display the graphical display item because of an engaging story and/ or an element of surprise provided by different graphical display items over time.

The system 100 may include a plurality of mobile, multi-function computers 102, which may include mobile phones, smart phones, tablet computers, portable computers (e.g., laptop and netbook computers), personal digital assistants (PDAs), portable media players (PMPs), and the like. Throughout this specification, the term "mobile device" will be used to refer to any of these mobile, multi-function computers 102. The mobile devices 102 are generally characterized by: a general purpose microprocessor (i.e., one that can be programmed to perform different functions at different times, according to the desires of the user); a memory device and/or system, storing an operating system and a plurality of applications; a display device; and one or more input devices, such as a keyboard, a keypad, a touch screen, a multi-touch screen, etc.

In the embodiment depicted in FIG. 1, the system 100 also includes a plurality of wireless access points 104, which may allow the mobile devices 102 to communicate with others of the mobile devices 102, and with a communication network 106. The wireless access points 104 may be part of a wireless local area network (WLAN), a cellular network, a wireless wide area network (WAN), etc. The network 106 may comprise one or more of a local area network (LAN), a WLAN, a WAN, the Internet, an intranet, an extranet, etc. The mobile devices 102 are communicatively coupled to the network 106 via the access points 104.

The system 100 may also comprise a plurality of computers 110 (e.g., a desktop computer, a laptop computer, a workstation, a server, etc.) communicatively coupled to the network 106. The computers 110 are generally characterized by: a general purpose microprocessor (i.e., one that can be programmed to perform different functions at different times, according to the desires of the user); a memory device and/or system, storing an operating system and a plurality of application programs; a display device; and one or more input devices, such as a keyboard, a keypad, a touch screen, a multi-touch screen, etc.

The system 100 also includes a server system 108 communicatively coupled to the network 106. The server system 108 may comprise one or more server devices, where each server device is generally characterized by: a general purpose microprocessor (i.e., one that can be programmed to perform different functions at different times, according to the desires of the user); a memory device and/or system, storing an operating system and a plurality of application programs; and one or more input devices, such as a keyboard, a keypad, a touch screen, a multi-touch screen, etc.

The server system 108 is configured to provide the graphical display items to be displayed on display devices of the mobile devices 102 and the computers 110. The graphical display items are transmitted by the server system 108 to the mobile devices 102 and to the computers 110 via the network 106. The graphical display items may be or serve as advertisements for goods and/or services, in an embodiment. In other embodiments, the graphical display items may provide other suitable types of information. As discussed above, different graphical display items may be displayed on a display device of a mobile device 102 or computer 110 at different times.

As described in the following paragraphs, the system 100 may include a software application program executable on the mobile devices 102. The application program, when executed by one or more processors of the mobile device 102, allows for displaying the graphical display items. The application program may be a web browser, a web browser plugin, a web browser modified by and/or operating in conjunction with a web browser plugin, an applet, or some other suitable application program capable of causing displaying graphical display items received from the server system 108 on a display device, in some embodiments.

In the context of web browsing, the graphical display items may be displayed in a web page, as a pop-up window, as a pop-under window, as a "hover ad," etc., in some embodiments. In the context of non-web browsing applications, the graphical display items may be displayed within a current application window, or within a new window, in some embodiments.

Figure 2:
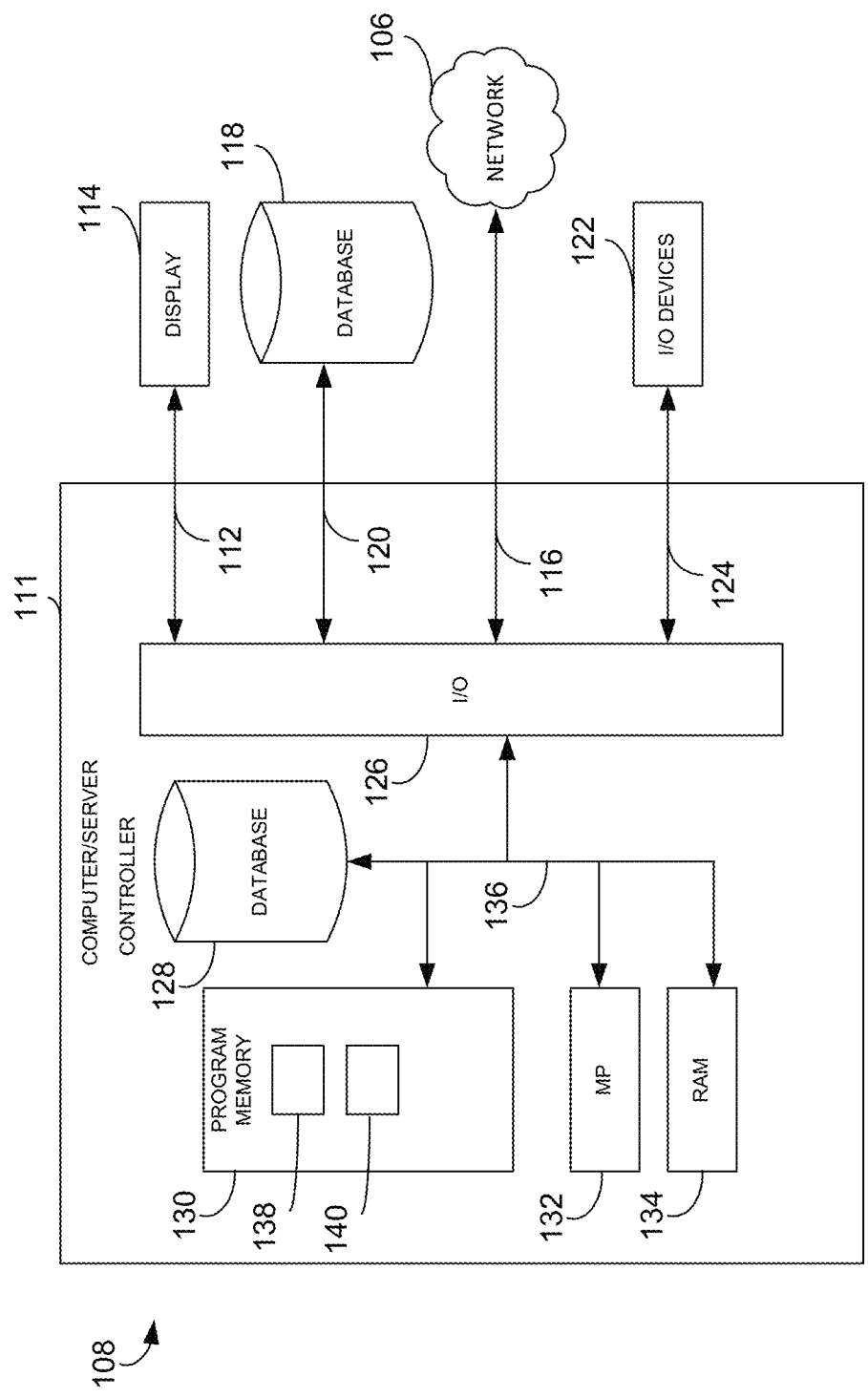
FIG. 2 is a block diagram of an example server system that may be utilized in the system of FIG. 1, according to an embodiment.

FIG. 2 depicts a block diagram of one possible embodiment of the server system 108. The server system 108 may comprise a controller 111 communicatively coupled by a video link 112 to a display device 114, by a network link 116 (i.e., an Ethernet or other network protocol) to the communication network 106, to one or more databases 118 via a data link(s) 120, and to various other I/O devices 122 (e.g., keyboards, keypads, touchscreens, scanners, printers, etc.) by appropriate links 124. The data links 112, 116, 120, and links 124 are each coupled to the server 108 via an input/output (I/O) circuit 126 of the controller 111. It should be noted that additional databases, such as a database 128 in the server 108 or other databases (not shown) may also be linked to the controller 111 in a known manner.

The controller 111 includes a program memory 130, a processor 132 (may be referred to herein as a microcontroller or a microprocessor), a random-access memory (RAM) 134, and the I/O circuit 126, all of which are interconnected via an address/data bus 136 (or multiple busses). It should be appreciated that although only one microprocessor 132 is shown, the controller 111 may include multiple microprocessors 132. Similarly, the memory of the controller 111 may include multiple RAMs 134 and multiple program memories 130. Although the I/O circuit 126 is shown as a single block, it should be appreciated that the I/O circuit 126 may include a number of different types of I/O circuits. The RAM(s) 134 and the program memory(ies) 130 may be implemented as semiconductor memories, magnetically readable memories, and/or optically readable memories, for example.

In an embodiment, the server system 108 includes multiple controllers 111. The multiple controllers 111 may be communicatively coupled to the same ones of the one or more databases 118 or to different ones of the one or more databases 118, in some embodiments.

The I/O circuit 126 may communicatively couple the other devices on the controller 133 to one or more other hardware devices in, or coupled to, the server system 108. For example, the I/O circuit 126 may communicatively couple the controller 130 to the communication network 106, via the link 116, which may comprise a wireless (e.g., IEEE 802.11) or wireline (e.g., Ethernet) connection. In some embodiments, a network interface device of the I/O circuit 126 may implement communication between the controller 130 and the communication network 106.

An operating system program 138 is stored in the program memory 130. The operating system program 138, when executed by the one or more processors 132, causes the one or more processors 132 to implement an operating system for the server system 108.

A server program 140 is stored in the program memory 130. The server program, when executed by the one or more processors 132, causes the server 108 to transmit graphical display items to the mobile devices 102 and the computers 110 via the network 106. The graphical display items may be stored in the database 118 and/or the RAM(s) 134.

The databases 118, 128 and the memories 130, 134 are examples of non-transitory electronic storage devices. Graphical display items may be stored in one more of the databases 118, 128 and the memories 130, 134.

Figure 3:
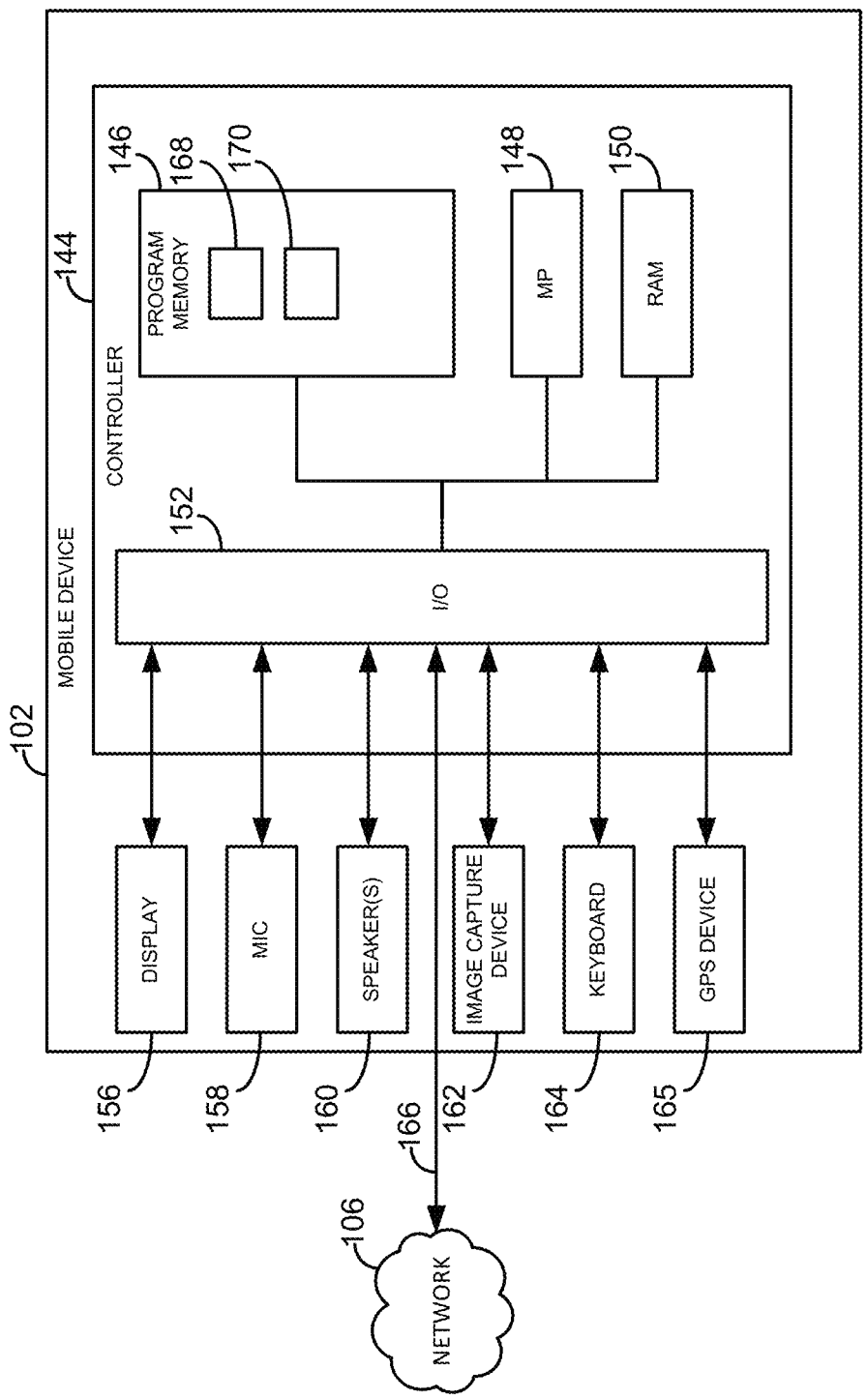
FIG. 3 is a block diagram of an example user computing device that may be utilized in the system of FIG. 1, according to an embodiment.

A block diagram of an exemplary embodiment of one of the mobile devices 102 is depicted in FIG. 3. Like the server system 108, the mobile device 102 includes a controller 144. The controller 144 includes a program memory 146, a processor 148, a RAM 150, and an I/O circuit 152, all of which are interconnected via an address/data bus 154. It should be appreciated that although only one microprocessor 148 is shown, the controller 144 may include multiple microprocessors 148. Similarly, the memory of the controller 144 may include multiple RAMs 150 and multiple program memories 146. Although the I/O circuit 152 is shown as a single block, it should be appreciated that the I/O circuit 152 may include a number of different types of I/O circuits. The RAM(s) 150 and the program memory(ies) 146 may be implemented as semiconductor memories, magnetically readable memories, and/or optically readable memories, for example.

The I/O circuit 152 may communicatively couple the other devices on the controller 144 to one or more other hardware devices in the mobile device 102. For example, the mobile device 102 includes an integrated display 156, which may be a touch sensitive display, a microphone 158, one or more speakers 160, an image capture device 162, a keyboard 164, and/or a geolocation device 165 (e.g., a global positioning system (GPS) receiver). If included, each of the microphone 158, the speakers 160, the image capture device 162, the keyboard 164, and the geolocation device 165 may be integrated in the mobile device 102 (e.g., in a mobile phone or a tablet computer), or may be a peripheral component. Additionally, the various components in the mobile device 102 may be integrated on a single printed circuit board (PCB) (not shown) and/or may be mounted within a single housing (not shown). Further, each of the other devices may operate individually such that the other devices may be turned on or off depending on the need to conserve battery life of the mobile device.

The I/O circuit 152 may also communicatively couple the controller 144 to the communication network 106, via a link 166, which may comprise a wireless (e.g., IEEE 802.11) or wireline (e.g., Ethernet) connections. In some embodiments, a network interface device of the I/O circuit 152 may implement communication between the controller 144 and the communication network 106.

An operating system program 168 is stored in the program memory 146. The operating system program 168, when executed by the one or more processors 148, causes the one or more processors 148 to implement an operating system for the mobile device 102.

An application program 170 is stored in the program memory 146. The application program 170, when executed by the one or more processors 148, causes the one or more processors 148 to display on the display device 146 graphical display items received from the server system 108 via the network 106. In an embodiment, the application program 170 comprises a web browser. In another embodiment, the application program 170 is a suitable program other than a web browser, such as a game application. The graphical display items received from the server system 108 may be stored in the RAM(s) 150.

The memories 146, 150 are examples of non-transitory electronic storage devices.

Referring again to FIG. 1, the computer 110 may have a structure the same as or similar to the structure illustrated in FIG. 3. For example, the computer 110 may include a display device separate from a housing in which the controller 144 is included, in an embodiment. As another example, the computer 110 may include other type of input and/or output devices (e.g., keyboard, microphone, etc.) that separate from the housing, in an embodiment.

Figure 4:
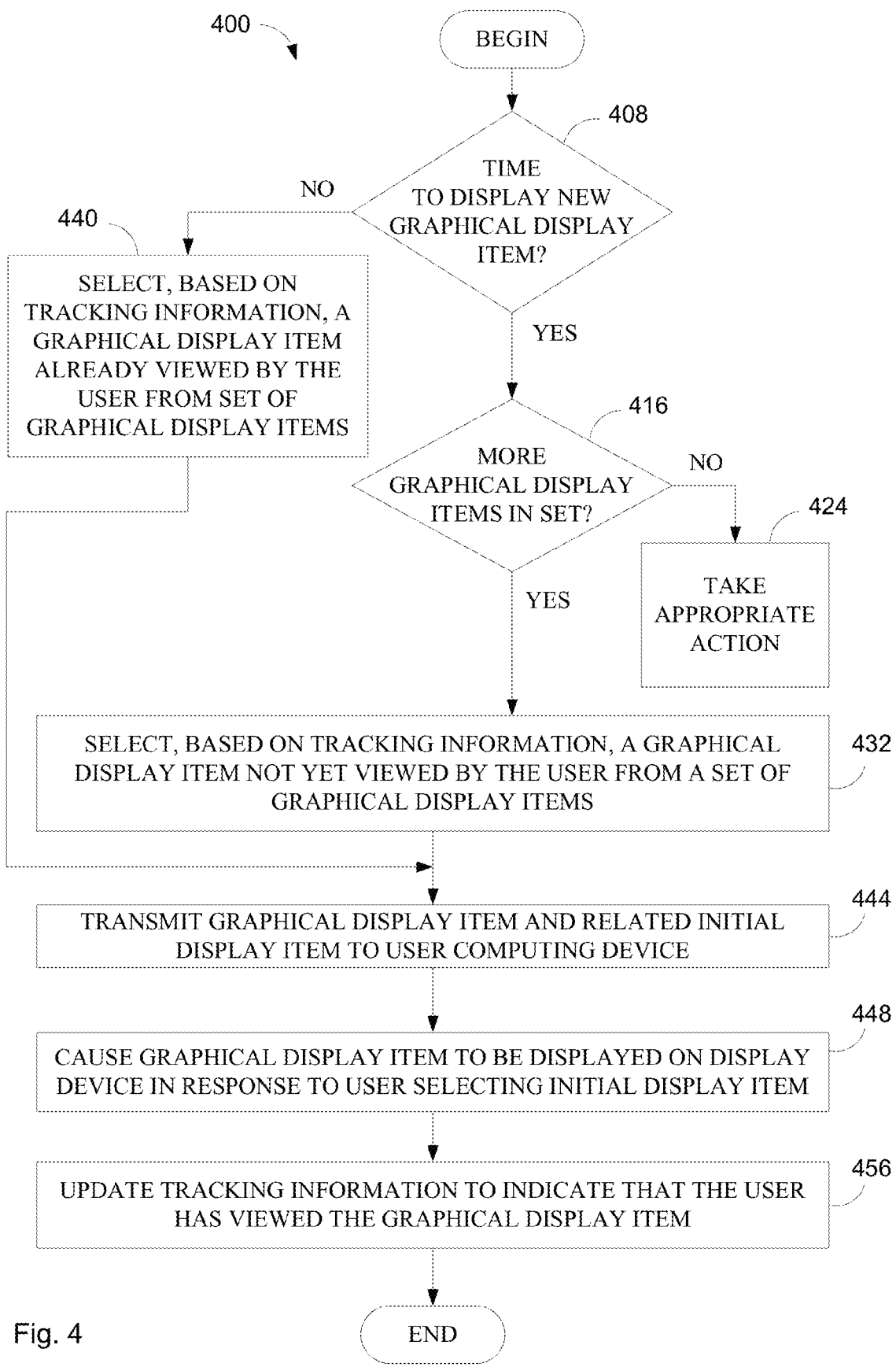
FIG. 4 is a flow diagram of an example method for causing graphical display items to be displayed on a display device of a computing device such as the computing device of FIG. 3, according to an embodiment.

FIG. 4 is an example method 400 for causing graphical display items to be displayed on a display device of a computing device such as the mobile devices 102 or the computer 110 of FIG. 1. The method 400 may be implemented by the server system 108, in an embodiment. For example, the server program 140 (FIG. 2) may include instructions that, when executed by the one or more processors 132, may cause the server system 108 to implement the method 400. In other embodiments, the method 400 may be implemented at least partially by a computing device of the user (e.g., the mobile device 102 or the computer 110). For example, the application program 170 (FIG. 3) may include instructions that, when executed by the one or more processors 148, may cause the computing device to implement at least a portion of the method 400.

The method 400 is described in the context of the system 100 of FIG. 1. In other embodiments, however, a suitable device or system other than the server system 108 and/or the mobile device 102/computer 110 may implement the method 400, and/or the method 400 may be utilized in a suitable system other than the system 100.

The method 400 may be implemented when a user visits a web page of a website, in an embodiment. For example, the method 400 may be implemented each time the user requests any web page from the website, in an embodiment. As another example, the method 400 may be implemented each time the user requests a particular web page from the website, in an embodiment. The method 400 may be implemented when a user visits a web page of one of a plurality of websites, in an embodiment. For example, the method 400 may be implemented each time the user requests any web page from any website of the plurality of websites, in an embodiment. As another example, the method 400 may be implemented each time the user requests a respective particular web page from each website in the plurality of websites, in an embodiment.

The method 400 relates to display of a graphical display item selected from a set of graphical display items. The set of graphical display items may, when displayed on a display device, provide visual information such as one or more of pictures, animation, graphics, video, text, etc. The set of graphical display items may also be related to audio items that, when rendered by an audio output device, provide audio information such as voice information, sound effects, music, etc. The set of graphical display items may be related such that, when viewed in a particular time sequence, the set of graphical display items tells an engaging story, in an embodiment. In another embodiment, the set of graphical display items may, when viewed in a time sequence, seem somewhat random, but surprising and engaging. In some embodiments, the information provided by the set of graphical display items, when displayed on a display device, is such that, after viewing a graphical display item in the set, the users are motivated to take action, subsequently, to view other graphical display items in the set. For example, when the set of graphical display items convey a story, the user may be motivated to discover what happens next in the story. As another example, when each next graphical display item is surprising and/or unexpected in the context of previously viewed graphical display items, the user may be motivated to discover what other graphical display items will appear next.

When there is a set of related audio items, the set of audio items, when rendered by an audio output device, may tell an engaging story, in an embodiment. When there is a set of related audio items, the set of audio items, when rendered by an audio output device, may seem somewhat random, but surprising and engaging, in an embodiment. In some embodiments, the information provided by the set of audio items, when rendered, is such that, after listening to an audio item in the set, the users are motivated to take action, subsequently, to hear other audio items in the set. For example, when the set of audio items convey a story, the user may be motivated to discover what happens next in the story. As another example, when each next audio item is surprising and/or unexpected in the context of previously heard audio items, the user may be motivated to discover what other audio items will be rendered next. In an embodiment, a set of related audio items includes new songs by an artist. In an embodiment, a set of related audio items includes statements made by a public figure. In an embodiment, a set of related audio items includes readings from a new book.

The set of graphical display items may be stored one more of the databases 118, 128 and the memories 130, 134 of the server system 108, in an embodiment. The set of audio items may be stored one more of the databases 118, 128 and the memories 130, 134 of the server system 108, in an embodiment.

In some embodiments, the set of graphical display items (and/or a set of audio items) may correspond to a category of goods or services to be advertised and/or a subject matter category. Additionally, web pages and/or web sites may be logically linked to a category so that a set of graphical display items (and/or a set of audio items) is targeted to specific web pages and/or web sites. For example, content of a web site and/or web page may be logically related to the category of goods or services to be advertised and/or the subject matter category. In some embodiments, when a user first visits a website (or web page), it is determined to which category the website (or web page) corresponds (e.g., is logically linked). Then, if there are multiple sets of graphical display items (and/or sets of audio items) that correspond to the category, one of the sets of graphical display items (and/or one of the sets of audio items) is selected using a suitable technique, such as randomly, according to a predefined order, etc. In some embodiments, a sponsor may purchase a category and the one or more sets of graphical display items (and/or sets of audio items) in the category relate to the sponsor and/or the products/services of the sponsor. In some embodiments, different sets of graphical display items (and/or sets of audio items) in a same category are purchased by different sponsors. In such embodiments, various suitable techniques are utilized to determine which set is to be utilized when a user first visits a website or web page, such as randomly with an equal distribution, randomly with a weighted distribution based on prices paid by the different sponsors, etc.

At block 408, it may be determined whether it is time to display a new graphical display item from a set of graphical display items (e.g., a graphical display item not yet viewed by the user). It may be desired that a new graphical display item be displayed to a user, potentially, each time the user visits a particular web page of a website, opens a particular application on a computing device, etc., in an embodiment. Thus, block 408 may comprise determining whether the user has newly visited the particular web page, newly opened the application, etc. In some embodiments, it may be desired that the new graphical display item be displayed to a user, potentially, each time the user visits a website but not each time the user opens a page within the website. Thus, block 408 may comprise determining whether the user has returned to the website after leaving the website (e.g., after shutting down the browser, after navigating to a different website, etc.) or whether the user has merely navigated from one web page in the website to another web page in the website.

In some embodiments, it may be desired that the new graphical display item be displayed to a user, potentially, only after at least a minimum amount of time has elapsed. Thus, block 408 may comprise determining whether the minimum amount of time has elapsed since the user last viewed a graphical display item from the set, in an embodiment. In some embodiments, it may be desired that the new graphical display item be displayed to a user, potentially, only after a previous graphical display item has already been viewed by the user at least a minimum amount of times. Thus, block 408 may comprise determining whether the previous graphical display item has already been viewed the minimum number of times, in an embodiment.

In another embodiment, determining, at block 408, whether it is time to display a new graphical display item from the set may be based on multiple factors. For example, block 408 may comprise (i) determining whether the user has newly visited the particular web page, newly opened the application, etc., and (ii) determining whether (a) the minimum amount of time has elapsed since the user last viewed a graphical display item from the set, or (b) the previous graphical display item was already viewed a minimum number of times, in an embodiment. For example, it may be desired that a new graphical display item be displayed to the user, potentially, when the user visits a particular web page of a website, opens a particular application on a computing device, etc., after a desired period of time has elapsed since the user last viewed a graphical display item in the set, according to an embodiment.

Determining whether it is time to display a new graphical display item from the set may be based on tracking information stored in a memory of the computing device being utilized by the user (e.g., the mobile device 102, the computer 110, etc.), in a memory of the server system 108, in a memory of a server system different than the server system 108 (e.g., a website server), etc., in some embodiments. The tracking information may indicate one or more of (i) a time at which the user last visited a web page, (ii) a time at which the user last visited a website, (iii) a time at which the user last opened an application, (iv) a time at which the user last viewed a graphical display item from the set, (v) which graphical display items from the set have been viewed by the user, (vi) which graphical display item from the set was last viewed by the user, (vii) a number of times the user viewed a most recently viewed graphical display item from the set, (viii) a respective number of times the user viewed each already viewed graphical display item from the set, etc.

If it is determined at block 408 that it is time to display a new graphical display item from the set, the flow may proceed to block 416, at which it is determined whether there are any graphical display items in the set that have not yet been viewed by the user. The determination at block 416 may be based on tracking information such as described above.

If it is determined that there are no graphical display items in the set that have not yet been viewed by the user (i.e., the user has already viewed all of the graphical display items in the set), the flow may proceed to block 424 at which an appropriate action may be taken. For example, a new set of graphical display items may be selected for display to the user and the flow may proceed to block 440 (discussed below), in an embodiment. As another example, the tracking information may be modified to indicate that none of the graphical display items have been viewed by the user and the flow may proceed to block 440 (discussed below), in an embodiment. As another example, the flow may end, in an embodiment.

On the other hand, if it is determined at block 416 that there are one or more graphical display items in the set that have not yet been viewed by the user, the flow may proceed to block 432. At block 432, a graphical display item is selected from a set of graphical display items. Block 432 may comprise selecting, from the set, a graphical display item that has not been previously viewed by a user based on tracking information (discussed above) corresponding to the user. In one embodiment, block 432 comprises determining a subset of graphical display items, in the set of graphical display items, that have not previously been viewed by the user, and selecting a graphical display item from the subset of graphical display items. The subset of graphical display items that have not previously been viewed by the user may be determined based on tracking information such as described above.

In some embodiments, the graphical display items in the set may be ordered, and selecting the graphical display item may involve selecting the next graphical display item (not yet viewed by the user) in the order. For example, the graphical display items in the set may depict a story when viewed in the order. As another example, an advertiser may intend that the graphical display items in the set be viewed in the order for a desired marketing effect.

In other embodiments, selecting the graphical display item may involve randomly selecting a graphical display item not yet viewed by the user. As used herein, the term "randomly selecting" is intended to cover both random selection techniques as well as pseudo-random selection techniques.

In some embodiments that include a set of related audio items, each graphical display item may correspond to a respective audio item, and when a graphical display item is selected, the corresponding audio item may also be selected. In other embodiments, the method 400 may include a separate act (not shown in FIG. 4) of selecting an audio item from the set of related audio items.

In embodiments that include a separate act of selecting an audio item, selecting the audio item also may be based on the tracking information in a similar manner. In some embodiments, the audio items in the set may be ordered, and selecting the audio item may involve selecting the next audio item (not yet heard by the user) in the order. For example, the audio items in the set may depict a story when rendered in the order. As another example, an advertiser may intend that the audio items in the set be rendered in the order for a desired marketing effect. In other embodiments, selecting the audio item may involve randomly selecting an audio item not yet heard by the user. The tracking information may include information indicating one or both of (i) which audio items in the related set have already been rendered to the user, and (ii) which audio item in the related set was last rendered to the user, in some embodiments.

In some embodiments that include a set of related audio items, each graphical display item may correspond to a respective audio item, and when a graphical display item is selected at block 440, the corresponding audio item may also be selected. In other embodiments, the method 400 may include a separate act (not shown in FIG. 4) of selecting an audio item from the set of related audio items. In embodiments that include a separate act of selecting an audio item, selecting the audio item also may be based on the tracking information in a similar manner.

Referring again to block 408, if it is determined at block 408 that it is not time to display a new graphical display item from the set, the flow may proceed to block 440. At block 440, a graphical display item that was already viewed by the user is selected from a set of graphical display items. Block 440 may comprise selecting, from the set, a graphical display item that has was previously viewed by a user based on tracking information (discussed above) corresponding to the user. Block 440 may comprise selecting the graphical display item most recently viewed by the user, in an embodiment. For example, if the graphical display items are to be viewed in an order, the graphical display item most recently viewed by the user may be selected, in an embodiment. Block 440 may comprise randomly selecting a graphical display item previously viewed by the user, in an embodiment.

The flow may proceed from blocks 432 and 440 to block 444. At block 444, the selected graphical display item and an initial display item that is related to the graphical display item may be transmitted to the user computer. The initial display item may be stored one more of the databases 118, 128 and the memories 130, 134 of the server system 108, in an embodiment. As will be described in more detail below, the initial display item and the graphical display item are configured for display on a display device of the computing device being utilized by the user. In an embodiment, the initial display item and the graphical display item may be components of a display object (e.g., corresponding to a rollover advertisement), and may be transmitted together. The display object may be stored one more of the databases 118, 128 and the memories 130, 134 of the server system 108, in an embodiment.

As another example, the graphical display item may be transmitted only in response to the user selecting the initial display item while the initial display item is being displayed on the display device of the user computing device. Selection of the initial display item is described in more detail below.

In an embodiment, a single initial display item is associated with all of the graphical display items in the set of graphical display items. In other embodiments, there may be a set of multiple initial display items, and the method 400 may include selecting an initial display item from the set of initial display items. In some embodiments, selecting the initial display item is based on which graphical display item was selected at block 432 or block 440. For example, in one embodiment, each initial display item corresponds to a respective graphical display item. As another example, in one embodiment, each initial display item corresponds to a respective subset of graphical display items. Thus, in some embodiments, selecting the initial display item may depend on which graphical display item was selected at block 432 or block 440. In other embodiments, method 400 may include randomly selecting an initial display item from the set of initial display items.

At block 448, the selected graphical display item is displayed on a display device of the computing device being utilized by the user in response to detecting a user selection of the initial display item. For example, the initial display item and the graphical display item may be components of a display object corresponding to a rollover advertisement, in an embodiment. For instance, the initial display item may be displayed in a web page, and in response to the user selecting the initial display item by moving a cursor over the initial display item using an input device such as a mouse, the graphical display item may be displayed in the web page.

As another example, the graphical display item may be displayed in the web page in response to the user selecting the initial display item by moving the cursor over the initial display item and then pressing a mouse button. As yet another example, the graphical display item may be displayed in the web page in response to the user selecting the initial display item by pressing a touch screen at a position over the initial display item.

The initial display item may, when displayed on a display device, provide visual information such as one or more of pictures, animation, graphics, video, text, etc. The visual information provided by the initial display item may indicate that (i) a graphical display item from the set of graphical display items and/or (ii) an audio item from the related set of audio items may be viewed/heard by selecting the initial display item, and thus the visual information may motivate the user to select the initial display item, in various embodiments.

The user computing device may be configured to detect a user selection of the initial display item, in an embodiment. For example, the operating system 168 and/or the application program 170 may include machine readable instructions that, when executed by the processors 148, enable the processor to determine when a user selection of the initial display item has occurred, in an embodiment. The user computing device may be configured to, in response to detecting user selection of the initial display item, display the selected graphical display item, in an embodiment. For example, the operating system 168 and/or the application program 170 may include machine readable instructions that, when executed by the processors 148, cause the processor to display the selected graphical display item in response to determining that the user selected the initial display item, in an embodiment. The user computing device may be configured to, in response to detecting user selection of the initial display item, cause the network interface of the user computing device to transmit an indication of user selection of the initial display item to the server system 108, in an embodiment. For example, the operating system 168 and/or the application program 170 may include machine readable instructions that, when executed by the processor 148, cause the processor 148 to cause the network interface to transmit an indication of user selection of the initial display item to the server system 108, in an embodiment.

Figure 5A:
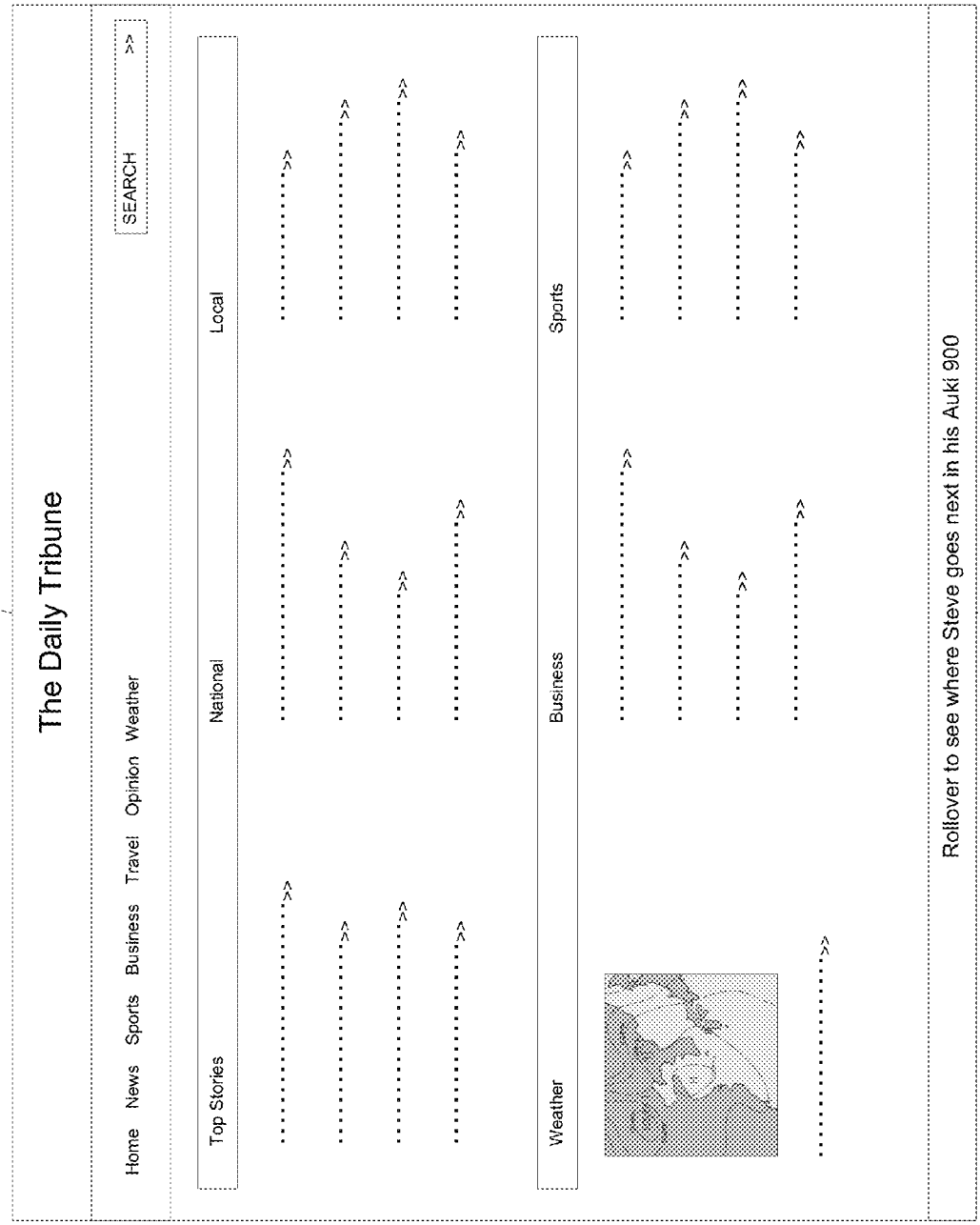
FIG. 5A is an illustration of an example web page, according to an embodiment.

FIG. 5A is an illustration of a web page 500 in which an example initial display item 504 is displayed, according to an embodiment. The web page 500 may be displayed on a display device of a user computing device (e.g., the mobile device 102, the computer 110, etc.). The initial display item 504 conveys information regarding the set of graphical display items. The conveyed information may be textual and/or graphical, and the conveyed information may be designed so that users are motivated to take action to view graphical display items in the set. In the example of FIG. 5A, the initial display item 504 refers to a popular character or celebrity ("Steve"), and generally refers to or hints at a story or series of episodes involving "Steve" going to different destinations in an automobile ("Auki 500"). The initial display item 504 and the set of graphical display items may correspond to an advertisement for the "Auki 500" brand/model of car, for example.

In an embodiment, if the user moves a cursor over the initial display item 504 (i.e., "rolls over" the initial display item 504), in response, a graphical display item from the set is selected and then displayed on the display device. In another embodiment, if the user moves a cursor over the initial display item 504 and then selects the initial display item (e.g., by pressing a button on a mouse or track ball device), in response, a graphical display item from the set is selected and then displayed on the display device. In another embodiment, if the user presses a touch screen at the position of the initial display item 504, in response, a graphical display item from the set is selected and then displayed on the display device.

Figure 5B:
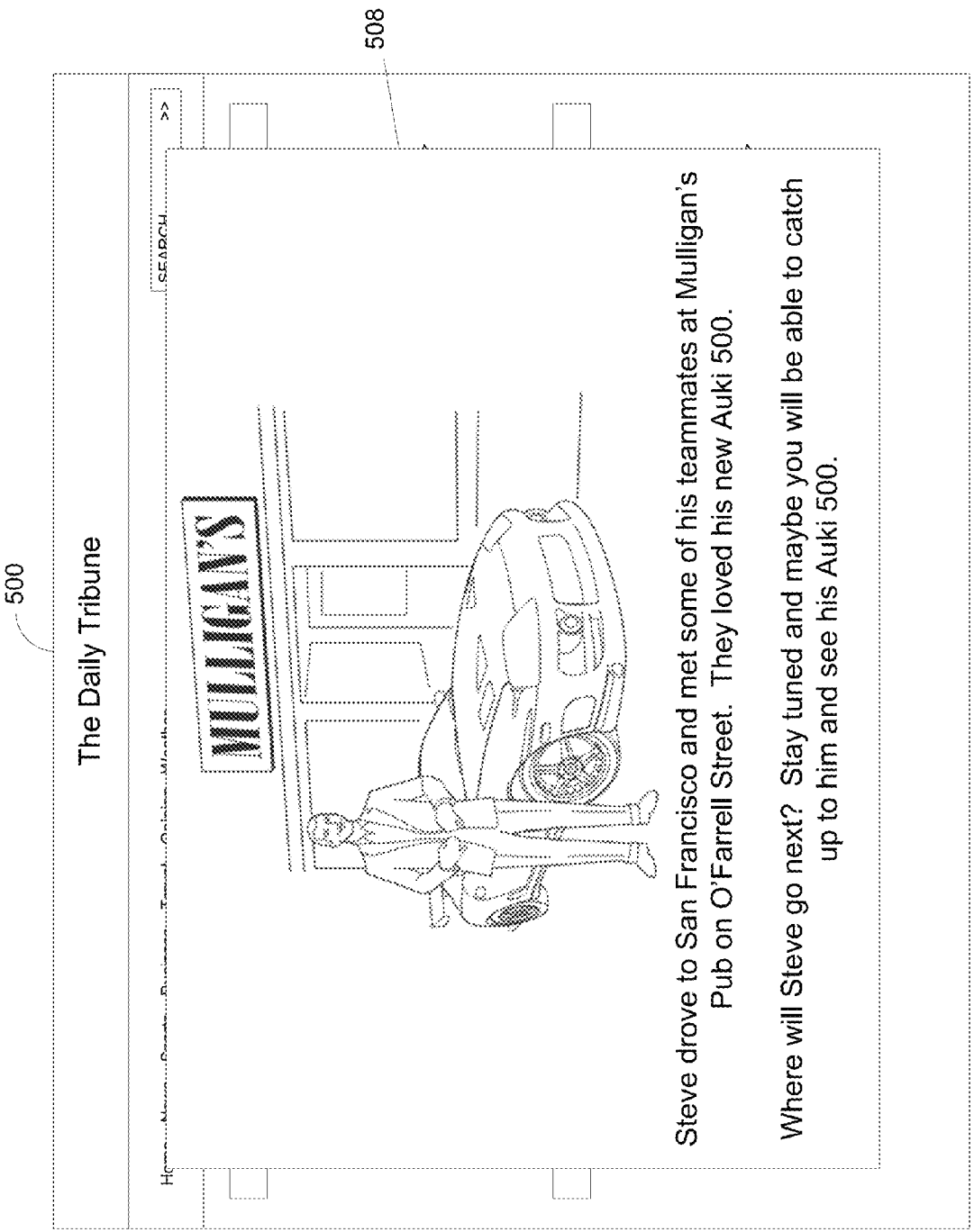
FIG. 5B is an illustration of an example graphical display item displayed within or overlaying the web page of FIG. 5A, according to an embodiment.

FIG. 5B is an illustration of the web page 500 of FIG. 5A after a user selected the initial display item 504, according to an embodiment. In response to the user selection of the initial display item, a graphical display item 508 from the set was selected and then displayed on the display device. The graphical display item 508 may be displayed in the same window as the web page 500 and overlay the web page 500, in an embodiment. For example, the graphical display item 508 may comprise a "hover ad," in an embodiment. In another embodiment, the graphical display item 508 may be displayed in the same window as the web page 500 so as to avoid or minimize overlap with content of the web page 500, except perhaps the initial display item 504 if it is still included in the web page 500, in an embodiment. In some embodiments, the initial display item 504 is removed from the web page 500 when displaying the graphical display item 508. In some embodiments, the initial display item 504 is covered, at least partially, by the graphical display item 508.

In some embodiments, the graphical display item 508 may be displayed in a different window than the web page 500 (e.g., in a pop-up window).

In an embodiment in which a song is rendered to correspond with display of the graphical display item, the graphical display item may provide textual and/or graphical information about the song such as one or more of the artist, the name of the song, an album in which the song is included, etc.

Referring again to FIG. 4, at block 456, the tracking information may be updated to indicate that the user has viewed the graphical display item selected at block 432. In an embodiment, if a previously viewed graphical display item is selected at block 440, block 456 may be skipped. Block 456 may be performed only in response to determining that the user selected the initial display item, in an embodiment. In an embodiment, block 456 may comprise receiving an indication from the user computing device that the user selected the initial display item, and updating the tracking information in response to receiving the indication. The tracking information may be stored in one more of the databases 118, 128 and the memories 130, 134 of the server system 108, in an embodiment. The tracking information may be stored in one or more of the memories 146, 150 of the user computing device, in an embodiment.

Figure 6:
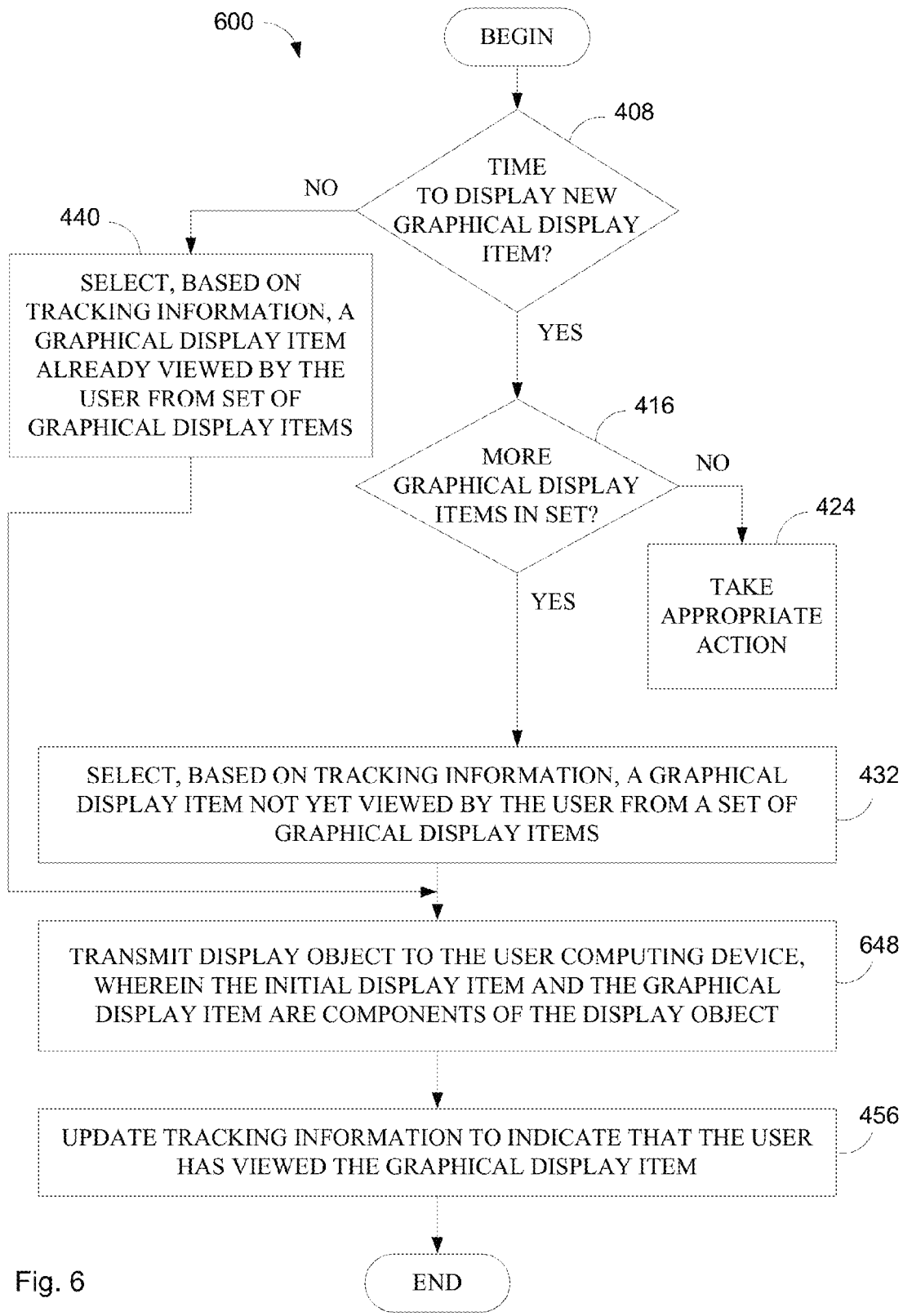
FIG. 6 is a flow diagram of another example method for causing graphical display items to be displayed on a display device of a computing device such as the computing device of FIG. 3, according to an embodiment.

FIG. 6 is an example method 600 for causing graphical display items to be displayed on a display device of a computing device such as the mobile devices 102 or the computer 110 of FIG. 1. The method 600 may be implemented by the server system 108, in an embodiment. For example, the server program 140 (FIG. 2) may include instructions that, when executed by the one or more processors 132, may cause the server system 108 to implement the method 600. The method 600 is described in the context of the system 100 of FIG. 1. In other embodiments, however, a suitable device or system other than the server system 108 may implement the method 600, and/or the method 600 may be utilized in a suitable system other than the system 100.

The method 600 may be implemented when a user visits a web page of a website, in an embodiment. For example, the method 600 may be implemented each time the user requests any web page from the website, in an embodiment. As another example, the method 600 may be implemented each time the user requests a particular web page from the website, in an embodiment. The method 600 may be implemented when a user visits a web page of one of a plurality of websites, in an embodiment. For example, the method 600 may be implemented each time the user requests any web page from any website of the plurality of websites, in an embodiment. As another example, the method 600 may be implemented each time the user requests a respective particular web page from each website in the plurality of websites, in an embodiment.

Blocks 408, 416, 424, 432 and 440 may be the same as or similar to the like-numbered blocks of FIG. 4, except that blocks 432 and 440 each flow to block 648.

At block 648, a display object is transmitted to the user computing device. The display object includes the initial display item discussed above and the graphical display item selected at block 432 or block 440 (i.e., the initial display item and the selected graphical display item may be components of the display object), in an embodiment. For example, the display object corresponds to a rollover advertisement, in an embodiment. The display object may be configured such that the initial display item is displayed in a web page, and in response to the user selecting the initial display item by moving a cursor over the initial display item using an input device such as a mouse, the graphical display item may be displayed in the web page, in an embodiment. As another example, the display object may be configured such that the graphical display item is displayed in the web page in response to the user selecting the initial display item by moving the cursor over the initial display item and then pressing a mouse button, in an embodiment. As yet another example, the display object may be configured such that the graphical display item is displayed in the web page in response to the user selecting the initial display item by pressing a touch screen at a position over the initial display item, in an embodiment.

The flow may then to proceed to block 456, which may be the same as or similar to block 456 of FIG. 4.

In an embodiment, an audio item may be selected as discussed with respect to FIG. 4, and the audio item may be included in the display object. In another embodiment, an audio item may be selected as discussed with respect to FIG. 4, and the audio item may be associated with the display object but transmitted as a separate object. The display object may be configured such that the audio item is rendered by the computing device in response to the user selecting the initial display item, in an embodiment.

Figure 7:
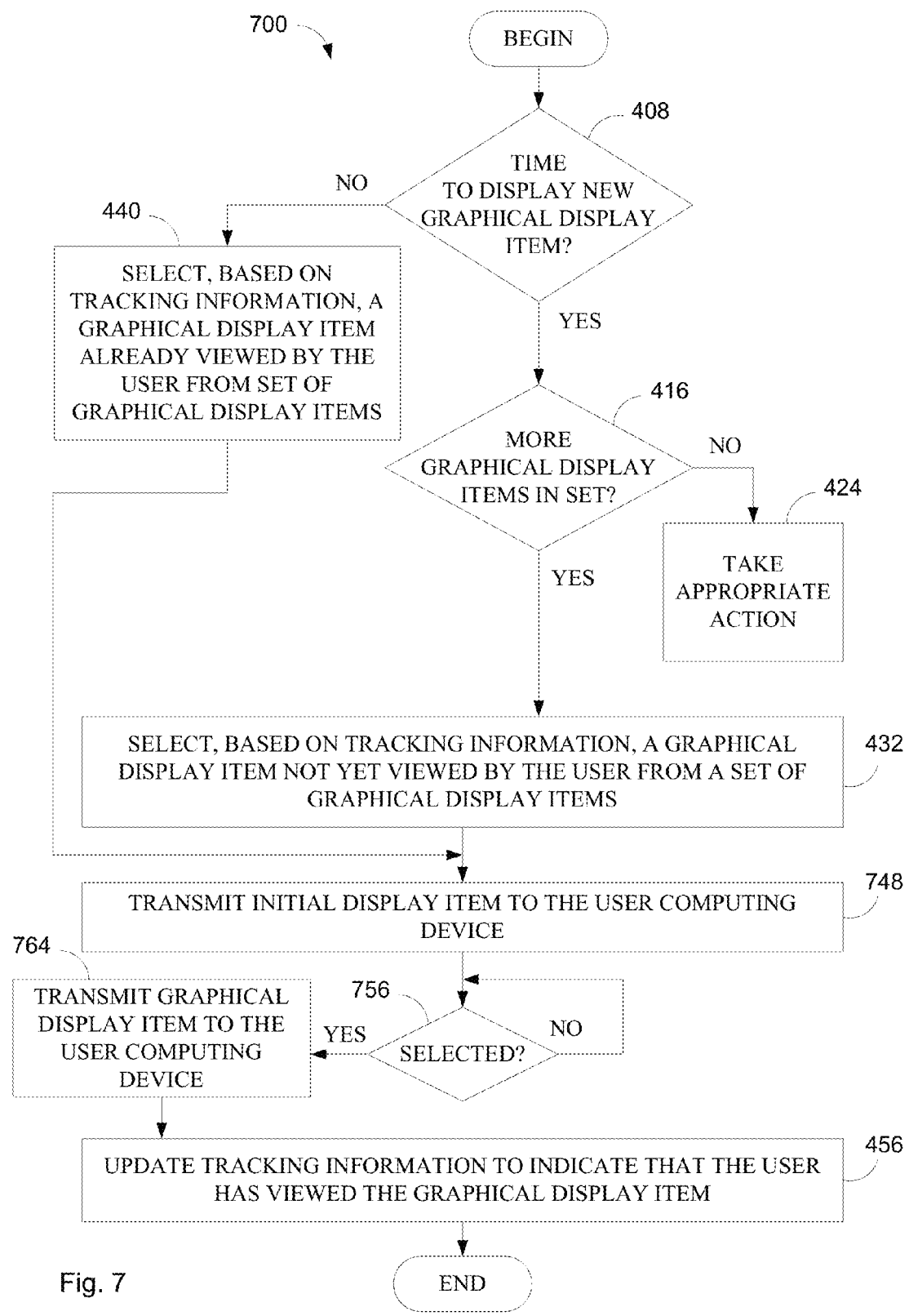
FIG. 7 is a flow diagram of yet another example method for causing graphical display items to be displayed on a display device of a computing device such as the computing device of FIG. 3, according to an embodiment.

FIG. 7 is an example method 700 for causing graphical display items to be displayed on a display device of a computing device such as the mobile devices 102 or the computer 110 of FIG. 1. The method 700 may be implemented by the server system 108, in an embodiment. For example, the server program 140 (FIG. 2) may include instructions that, when executed by the one or more processors 132, may cause the server system 108 to implement the method 600. The method 700 is described in the context of the system 100 of FIG. 1. In other embodiments, however, a suitable device or system other than the server system 108 may implement the method 700, and/or the method 700 may be utilized in a suitable system other than the system 100.

The method 700 may be implemented when a user visits a web page of a website, in an embodiment. For example, the method 700 may be implemented each time the user requests any web page from the website, in an embodiment. As another example, the method 700 may be implemented each time the user requests a particular web page from the website, in an embodiment. The method 700 may be implemented when a user visits a web page of one of a plurality of websites, in an embodiment. For example, the method 700 may be implemented each time the user requests any web page from any website of the plurality of websites, in an embodiment. As another example, the method 700 may be implemented each time the user requests a respective particular web page from each website in the plurality of websites, in an embodiment.

Blocks 408, 416, 424, 432 and 440 may be the same as or similar to the like-numbered blocks of FIG. 4, except that blocks 432 and 440 each flow to block 748.

At block 748, the initial display item is transmitted to the user computing device. At block 756, it may be determined whether the initial display item was selected by the user. For example, it may be determined whether the user moved a cursor over the initial display item using an input device such as a mouse, in an embodiment. As another example, it may be determined whether the user moved the cursor over the initial display item and then pressed a button of a mouse or trackball, in an embodiment. As yet another example, it may be determined whether the user pressed a touch screen at a position over the initial display item, in an embodiment. Block 756 may comprise receiving an indication from the user computing device that the user selected the initial display item.

If it is determined that the user selected the initial display item, the flow may proceed to block 764. For example, the flow may proceed to block 764 in response to receiving an indication from the user computing device that the user selected the initial display item, in an embodiment. At block 764, the graphical display item selected at block 432 or block 440 (i.e., the initial display item and the selected graphical display item may be components of the display object) is transmitted to the user computing device.

The flow may then to proceed to block 456, which may be the same as or similar to block 456 of FIG. 4.

In an embodiment, an audio item may be selected as discussed with respect to FIG. 4, and the audio item may also be transmitted if it is determined, at block 756, that the user selected the initial display item. The audio item may be configured to be rendered by the user computing device in response to the user computing device receiving the audio item, in an embodiment.

In some embodiments, methods similar to the methods 400, 600 and 700 may replace selecting and transmitting a graphical display item from a set of graphical display items with selecting and transmitting an audio item from a set of audio items. The selected audio item may be rendered (e.g., using an audio output device) in response to the user selecting the initial display item. In an embodiment, in response to the initial display item being selected and while the selected audio item is rendered, an additional display item is displayed. In an embodiment, the additional display item is may be the same no matter which audio item is rendered. In another embodiment, the initial display item may be displayed while the selected audio item is rendered.

In some embodiments, the methods 400, 600 and/or 700 may omit blocks 408 and/or 440.

Other suitable modifications to the methods 400, 600 and/or 700 may be made, such as changing the order of blocks, omitting blocks adding additional blocks, combining blocks, etc. For example, in some embodiments, a graphical display item (and/or an audio item) is randomly selected from the set without regard for which graphical display items (or audio items) were already viewed by the user.

In an embodiment, the set of graphical items (and/or the set of audio items) may be linked to a web page such that in response to the web page being requested by a user computer, a suitable method such as the method 400, 600 or 700 is implemented. In an embodiment, the set of graphical items (and/or the set of audio items) may be linked to a group of web pages such that in response to a web page in the group being requested by a user computer, a suitable method such as the method 400, 600 or 700 is implemented. The web pages in the group may belong to the same website, in an embodiment, or to different web sites, in another embodiment.

In an embodiment, the set of graphical items (and/or the set of audio items) may be linked to an application program running on the user computing device (e.g., a smart phone app) such that in response to the application program starting on the user computer (or some other suitable event involving the application program), a suitable method such as the method 400, 600 or 700 is implemented. For example, the initial display item/selected graphical display item may be displayed in a window of the application, in a new window, etc., the audio item may be rendered while the application program is running, etc. In an embodiment, the set of graphical items (and/or the set of audio items) may be linked to a group of application programs such that in response to an application program in the group starting on the user computer (or some other suitable event involving the application), a suitable method such as the method 400, 600 or 700 is implemented. The application programs in the group may be developed by, sold by, and/or distributed by, etc., the same entity, in an embodiment, or by different entities, in another embodiment.

In embodiments in which a graphical display item (and/or audio item) is randomly selected from a set, any suitable random or pseudo-random technique may be utilized. In one embodiment, randomly selecting a graphical display item (and/or audio item) from a set involves using a cellular automata technique.

Some of the blocks of the methods 400, 600 and/or 700 may be implemented, at least partially, by the user computing device. For example, the user computing device may be configured to implement the block 408, and transmit a request to the server system 108 for either a graphical display item already viewed by the user (if it is not time to display a new graphical display item) or a graphical display item not yet viewed by the user (if it is time to display a new graphical display item). For example, the application program 170 may include machine readable instructions that, when executed by the processor 148, enable the processor to (i) determine whether it is time to display a new graphical display item, (ii) cause a network interface of the user computing device to transmit a request to the server system 108 for a graphical display item already viewed by the user if it is not time to display a new graphical display item, and (iii) cause the network interface of the user computing device to transmit a request to the server system 108 for a graphical display item not yet viewed by the user if it is time to display a new graphical display item, in an embodiment.

As another example, the user computing device may be configured to implement the block 456, at least partially. For example, the application program 170 may include machine readable instructions that, when executed by the processor 148, cause the processor to update tracking information stored in an electronic storage device of the user computing device, in an embodiment.

As used herein, the terms "application" and "application program" are intended to encompass a single application, a set of multiple applications, an application modified by or operating in conjunction with one or more applets or plug-ins, a single applet or plug-in, etc.

Any of the techniques described above, including the blocks described with reference to FIGS. 4, 6 and 7, may be implemented using a processor that executes machine readable software or firmware instructions. Such computer program instructions may control the operation of a computing device such as a server, a desktop computer, a laptop computer, a tablet computer, a workstation, a server, a mainframe, a mobile phone, a smart phone, a set top box, a gaming system, a personal digital assistant (PDA), etc. The computing device may have a memory (e.g., an electronic storage device such as described above) in which the computer program instructions may be stored. The computer program instructions may be written in any high level language such as, C, C++, C#, Java or the like or any low-level assembly or machine language. By storing computer program instructions in a memory of the computing device, the computing device is physically and/or structurally configured in accordance with the computer program instructions.

While many methods and systems have been described herein as being implemented using a processor executing machine readable instructions, they also may be implemented at least partially in hardware, and may be implemented by a variety of computing systems and devices. Thus, method blocks and system blocks described herein may be implemented in a standard multi-purpose central processing unit (CPU), a special purpose CPU, or on specifically designed hardware such as an application-specific integrated circuit (ASIC), a programmable logic device (PLD), a custom integrated circuit, or other suitable hard-wired device as desired. When implemented using a processor executing machine readable instructions, the machine readable instructions may be stored in any electronic storage device configured to store computer readable memory such as a magnetic disk, an optical disk (such as a compact disk (CD) or a digital versatile disk (DVD)), a flash memory, a memory card, a memory stick, a RAM, a ROM, a database system, etc.

The present disclosure has been described with reference to specific examples, which are intended to be illustrative only and not to be limiting. It will be apparent to those of ordinary skill in the art that changes, additions or deletions may be made to the disclosed examples without departing from the spirit and scope of the disclosure. The detailed description is to be construed as exemplary only and does not describe every possibly embodiment of the invention because describing every possible embodiment would be impractical, if not impossible. Numerous alternative embodiments could be implemented, using either current technology or technology developed after the filing date of this patent, which would still fall within the scope of this application.

Thus, many modifications and variations may be made in the techniques and systems described and illustrated herein without departing from the spirit and scope of the present invention. Accordingly, it should be understood that the methods and systems described herein are illustrative only and are not limiting upon the scope of the invention.

The invention claimed is:

1. A method, comprising:
   determining, with a computing system, a subset of graphical display items, in a set of graphical display items, that have not previously been viewed by a user based on tracking information stored in one or more electronic storage devices of the computing system, wherein the set of graphical display items are stored in the one or more electronic storage devices of the computing system;
   configuring, with the computing system, an initial display item to convey information about the set of graphical display items and to be displayed on a display device of a user computing device by an application executed by a processor of the user computing device;
   determining, with the computing system, whether a graphical display item, from the set of graphical display items, that was previously viewed by the user should be selected;
   in response to determining that a graphical display item that was previously viewed by the user should be selected, selecting, with the computing system and based on the tracking information stored in the one or more electronic storage devices, a graphical display item previously viewed by the user, the selected graphical display item configured to be displayed on the display device of the user computing device by the application;
   in response to determining that a graphical display item that was previously viewed by the user should not be selected, selecting, with the computing system, a graphical display item from the subset of graphical display items not previously viewed by the user, the selected graphical display item configured to be displayed on the display device of the user computing device by the application;
   in response to the user computing device electronically transmitting a request for a web page, electronically transmitting, with the computing system and via a communication network, the initial display item to the user computing device to be displayed within the web page;
   in response to the user selecting the initial display item when the initial display item is displayed on the display device, electronically transmitting, with the computing system and via the communication network, the selected graphical display item to the user computing device; and
   updating, with the computing system, the tracking information stored in the one or more electronic storage devices to indicate that the selected graphical display item has been viewed by the user in response to determining that the user selected the initial display item;
   wherein the graphical display item is at least one of:
   (i) configured to be displayed within the web page,
   (ii) configured to be displayed such that the graphical display item overlays at least a portion of the web page, and
   (iii) configured to be displayed in a first web browser window separate from a second web browser window that displays the web page.

2. A method according to claim 1, further comprising electronically receiving, from the user computing device and via the communication network, an indication that the user selected the initial display item.

3. A method according to claim 1, wherein selecting the graphical display item from the subset of graphical display items comprises randomly selecting, with the computing system, the graphical display item from the subset of graphical display items.

4. A method according to claim 1, wherein (i) the initial display item and (ii) the selected graphical display item are electronically transmitted, with the computing system and via the communication network, within a data object that is configured to be processed by the application executed by the processor of the user computing device.

5. A method according to claim 1, further comprising:
   selecting, with the computing system, an audio item from a set of audio items related to the set of graphical display items;
   electronically transmitting, with the computing system and via the communication network, the selected audio item to the user computing device;
   wherein the initial display item and the selected audio item are configured such that the selected audio item is rendered with an audio output device of the user computing device in response to the user selecting the initial display item when the initial display item is displayed on the display device.

6. A method according to claim 5, wherein selecting the audio item from the set of audio items comprises selecting, with the computing system, the audio item from the set of audio items based on which graphical display item was selected from the set of graphical display items.

7. A method according to claim 6, wherein selecting the audio item from the set of audio items comprises selecting, with the computing system and based on tracking information stored in the one or more electronic storage devices, from the set of audio items an audio item not previously rendered by the user computing device;
wherein the method further comprises updating, with the computing system, the tracking information stored in the one or more electronic storage devices to indicate that the selected audio item has been rendered by the user computing device in response to determining that the user selected the initial display item.

8. A method according to claim 7, further comprising electronically receiving, from the user computing device and via the communication network, an indication that the user computing device selected the initial display item.

9. A method according to claim 5, wherein selecting the audio item from the set of audio items comprises randomly selecting, with the computing system, the audio item from the set of audio items.

10. A method according to claim 5, further comprising:
determining whether the user selects the initial display item when the initial display item is displayed on the display device; and
causing the selected graphical display item to be displayed on the display device of the user computing device by the application in response to determining that the user selected the initial display item.

11. A method according to claim 1, further comprising:
storing tracking information in the one or more electronic storage devices of the computing system, the tracking information indicating whether the graphical display item has been previously viewed by the user;
wherein determining the subset of graphical display items that have not previously been viewed by the user is based on the tracking information.

12. A computing system, comprising:
a network interface configured to be communicatively coupled to a communication network;
one or more processors;
one or more electronic storage devices coupled to the one or more processors, wherein the one or more electronic storage devices store computer readable instructions that, when executed by the one or more processors, cause the one or more processors to:
determine a subset of graphical display items, in a set of graphical display items stored in the one or more electronic storage devices, that have not previously been viewed by a user based on tracking information stored in the one or more electronic storage devices,
configure an initial display item to convey information about the set of graphical display items and to be displayed on a display device of a user computing device by an application executed by a processor of the user computing device,
determine whether a graphical display item, from the set of graphical display items, that was previously viewed by the user should be selected,
in response to determining that a graphical display item that was previously viewed by the user should be selected, select, based on the tracking information stored in the one or more electronic storage devices, a graphical display item previously viewed by the user, the selected graphical display item configured to be displayed on the display device of the user computing device by the application,
in response to determining that a graphical display item that was previously viewed by the user should not be selected, select a graphical display item from the subset of graphical display items not previously viewed by the user, the selected graphical display item configured to be displayed on the display device of the user computing device by the application,
in response to determining that the user computing device electronically transmitted a request for a web page, cause the network interface to transmit the initial display item to the user computing device via the communication network to be displayed within the web page,
in response to the user selecting the initial display item when the initial display item is displayed on the display device, cause the network interface to transmit the selected graphical display item to the user computing device via the communication network, and
update the tracking information stored in the one or more electronic storage devices to indicate that the selected graphical display item has been viewed by the user in response to the user selecting the initial display item,
wherein the graphical display item is at least one of:
(i) configured to be displayed within the web page,
(ii) configured to be displayed such that the graphical display item overlays at least a portion of the web page, and
(iii) configured to be displayed in a first web browser window separate from a second web browser window that displays the web page.

13. A computing system according to claim 12, wherein the one or more electronic storage devices store computer readable instructions that, when executed by the one or more processors, cause the one or more processors to update the tracking information stored in the one or more electronic storage devices in response to an indication that the user selected the initial display item, wherein the indication is received from the user computing device via the communication network.

14. A computing system according to claim 12, wherein the one or more electronic storage devices store computer readable instructions that, when executed by the one or more processors, cause the one or more processors to select the graphical display item from the subset of graphical display items by randomly selecting the graphical display item from the subset of graphical display items.

15. A computing system according to claim 14, wherein the one or more electronic storage devices store computer readable instructions that, when executed by the one or more processors, cause the one or more processors to:
randomly select, based on tracking information stored in one or more electronic storage devices, from the subset of graphical display items a graphical display item not previously viewed by the user, and
update the tracking information stored in the one or more electronic storage devices to indicate that the selected graphical display item has been viewed by the user in response to determining that the user selected the initial display item.

16. A computing system according to claim 12, wherein the one or more electronic storage devices store computer readable instructions that, when executed by the one or more processors, cause the one or more processors to cause the network interface to transmit, via the communication network, a data object that includes (i) the initial display item and (ii) the selected graphical display item, wherein the data object is configured to be processed by the application executed by the processor of the user computing device.

17. A computing system according to claim 12, wherein the one or more electronic storage devices store computer readable instructions that, when executed by the one or more processors, cause the one or more processors to:
select an audio item from a set of audio items related to the set of graphical display items, wherein the set of audio items is stored in the one or more electronic storage devices;
cause the network interface to transmit, via the communication network, the selected audio item to the user computing device;
wherein the initial display item and the selected audio item are configured such that the selected audio item is rendered with an audio output device of the user computing device in response to the user selecting the initial display item when the initial display item is displayed on the display device.

18. A computing system according to claim 12, wherein the one or more electronic storage devices store computer readable instructions that, when executed by the one or more processors, cause the one or more processors to:
determine whether the user selects the initial display item when the initial display item is displayed on the display device; and
cause the selected graphical display item to be displayed on the display device of the user computing device by the application in response to determining that the user selected the initial display item.

19. A computing system according to claim 12, wherein the one or more electronic storage devices store computer readable instructions that, when executed by the one or more processors, cause the one or more processors to:
store tracking information, the tracking information indicating whether the graphical display item has been previously viewed by the user;
wherein the subset of graphical display items that have not previously been viewed by the user is determined based on the tracking information.

20. One or more first non-transitory electronic storage devices having stored thereon computer readable instructions that, when executed by one or more processors, cause the one or more processors to:
determine a subset of graphical display items, in a set of graphical display items stored in one or more second non-transitory electronic storage devices, that have not previously been viewed by a user based on tracking information stored in the one or more electronic storage devices,
configure an initial display item to convey information about the set of graphical display items and to be displayed on a display device of a user computing device by an application executed by a processor of the user computing device,
determine whether a graphical display item, from the set of graphical display items, that was previously viewed by the user should be selected,
in response to determining that a graphical display item that was previously viewed by the user should be selected, select, based on the tracking information stored in the one or more electronic storage devices, a graphical display item previously viewed by the user, the selected graphical display item configured to be displayed on the display device of the user computing device by the application,
in response to determining that a graphical display item that was previously viewed by the user should not be selected, select a graphical display item from the subset of graphical display items not previously viewed by the user, the selected graphical display item configured to be displayed on the display device of the user computing device by the application,
in response to determining that the user computing device electronically transmitted a request for a web page, cause a network interface of the computing system to electronically transmit, via a communication network, the initial display item to the user computing device to be displayed within the web page,
in response to the user selecting the initial display item when the initial display item is displayed on the display device, cause the network interface of the computing system to electronically transmit, via the communication network, the selected graphical display item to the user computing device, and
update the tracking information stored in the one or more electronic storage devices to indicate that the selected graphical display item has been viewed by the user in response to the user selecting the initial display item,
wherein the graphical display item is at least one of:
(i) configured to be displayed within the web page,
(ii) configured to be displayed such that the graphical display item overlays at least a portion of the web page, and
(iii) configured to be displayed in a first web browser window separate from a second web browser window that displays the web page.

21. The one or more first non-transitory electronic storage devices of claim 20 having stored thereon computer readable instructions that, when executed by the one or more processors, cause the one or more processors to update the tracking information stored in the one or more second non-transitory electronic storage devices in response to an indication that the user selected the initial display item, wherein the indication is received from the user computing device via the communication network.

22. The one or more first non-transitory electronic storage devices of claim 20 having stored thereon computer readable instructions that, when executed by the one or more processors, cause the one or more processors to select the graphical display item from the subset of graphical display items by randomly selecting the graphical display item from the subset of graphical display items.

23. The one or more first non-transitory electronic storage devices of claim 22 having stored thereon computer readable instructions that, when executed by the one or more processors, cause the one or more processors to:
randomly select, based on tracking information stored in one or more second non-transitory electronic storage devices, from the subset of graphical display items a graphical display item not previously viewed by the user, and
update the tracking information stored in the one or more second non-transitory electronic storage devices to indicate that the selected graphical display item has been viewed by the user in response to determining that the user selected the initial display item.

24. The one or more first non-transitory electronic storage devices of claim 20 having stored thereon computer readable instructions that, when executed by the one or more processors, cause the one or more processors to cause the network interface to transmit, via the communication network, a data object that includes (i) the initial display item and (ii) the selected graphical display item, wherein the data object is configured to be processed by the application executed by the processor of the user computing device.

25. The one or more first non-transitory electronic storage devices of claim 20 having stored thereon computer readable instructions that, when executed by the one or more processors, cause the one or more processors to:
   select an audio item from a set of audio items related to the set of graphical display items, wherein the set of audio items is stored in the one or more second non-transitory electronic storage devices;
   cause the network interface to transmit, via the communication network, the selected audio item to the user computing device;
   wherein the initial display item and the selected audio item are configured such that the selected audio item is rendered with an audio output device of the user computing device in response to the user selecting the initial display item when the initial display item is displayed on the display device.

26. The one or more first non-transitory electronic storage devices of claim 20 having stored thereon computer readable instructions that, when executed by the one or more processors, cause the one or more processors to:
   determine whether the user selects the initial display item when the initial display item is displayed on the display device; and
   cause the selected graphical display item to be displayed on the display device of the user computing device by the application in response to determining that the user selected the initial display item.

27. The one or more first non-transitory electronic storage devices of claim 20 having stored thereon computer readable instructions that, when executed by the one or more processors, cause the one or more processors to:
   store tracking information, the tracking information indicating whether the graphical display item has been previously viewed by the user;
   wherein the subset of graphical display items that have not previously been viewed by the user is determined based on the tracking information.

28. A method, comprising:
   determining, with a computing system, a subset of graphical display items, in a set of graphical display items, that have not previously been viewed by a user, wherein the set of graphical display items are stored in one or more electronic storage devices of the computing system;
   configuring, with the computing system, an initial display item to convey information about the set of graphical display items and to be displayed on a display device of a user computing device by an application executed by a processor of the user computing device;
   randomly selecting, with the computing system, a graphical display item from the subset of graphical display items not previously viewed by the user, the selected graphical display item configured to be displayed on the display device of the user computing device by the application;
   in response to the user computing device electronically transmitting a request for a web page, electronically transmitting, with the computing system and via a communication network, the initial display item to the user computing device to be displayed within the web page; and
   in response to the user selecting the initial display item when the initial display item is displayed on the display device, electronically transmitting, with the computing system and via the communication network, the selected graphical display item to the user computing device,
   wherein the graphical display item is at least one of:
      (i) configured to be displayed within the web page,
      (ii) configured to be displayed such that the graphical display item overlays at least a portion of the web page, and
      (iii) configured to be displayed in a first web browser window separate from a second web browser window that displays the web page.

29. A method according to claim 28, wherein determining the subset of graphical display items, in the set of graphical display items, that have not previously been viewed by the user, is based on tracking information stored in the one or more electronic storage devices;
   wherein the method further comprises updating, with the computing system, the tracking information stored in the one or more electronic storage devices to indicate that the selected graphical display item has been viewed by the user in response to determining that the user selected the initial display item.

30. A method according to claim 29, further comprising electronically receiving, from the user computing device and via the communication network, an indication that the user selected the initial display item.

31. A method according to claim 29, further comprising determining, with the computing system, whether a graphical display item, from the set, that was previously viewed by the user should be selected; and
   selecting, with the computing system and based on tracking information stored in the one or more electronic storage devices, a graphical display item previously viewed by the user in response to determining that a graphical display item that was previously viewed by the user should be selected;
   wherein selecting the graphical display item from the subset of graphical display items not previously viewed by the user is in response to determining that a graphical display item that was previously viewed by the user should not be selected.

32. A method according to claim 28, wherein (i) the initial display item and (ii) the selected graphical display item are electronically transmitted, with the computing system and via the communication network, within a data object that is configured to be processed by the application executed by the processor of the user computing device.

33. A method according to claim 28, further comprising:
   selecting, with the computing system, an audio item from a set of audio items related to the set of graphical display items;
   electronically transmitting, with the computing system and via the communication network, the selected audio item to the user computing device;
   wherein the initial display item and the selected audio item are configured such that the selected audio item is rendered with an audio output device of the user computing device in response to the user selecting the initial display item when the initial display item is displayed on the display device.

34. A method according to claim 33, wherein selecting the audio item from the set of audio items comprises selecting, with the computing system, the audio item from the set of audio items based on which graphical display item was selected from the set of graphical display items.

35. A method according to claim 34, wherein selecting the audio item from the set of audio items comprises selecting, with the computing system and based on tracking information stored in the one or more electronic storage devices, from the set of audio items an audio item not previously rendered by the user computing device;
wherein the method further comprises updating, with the computing system, the tracking information stored in the one or more electronic storage devices to indicate that the selected audio item has been rendered by the user computing device in response to determining that the user selected the initial display item.

36. A method according to claim 35, further comprising electronically receiving, from the user computing device and via the communication network, an indication that the user computing device selected the initial display item.

37. A method according to claim 33, wherein selecting the audio item from the set of audio items comprises randomly selecting, with the computing system, the audio item from the set of audio items.

38. A method according to claim 33, further comprising:
determining whether the user selects the initial display item when the initial display item is displayed on the display device; and
causing the selected graphical display item to be displayed on the display device of the user computing device by the application in response to determining that the user selected the initial display item.

39. A method according to claim 28, further comprising:
storing tracking information in the one or more electronic storage devices of the computing system, the tracking information indicating whether the graphical display item has been previously viewed by the user;
wherein determining the subset of graphical display items that have not previously been viewed by the user is based on the tracking information.

40. A computing system, comprising:
a network interface configured to be communicatively coupled to a communication network;
one or more processors;
one or more electronic storage devices coupled to the one or more processors, wherein the one or more electronic storage devices store computer readable instructions that, when executed by the one or more processors, cause the one or more processors to:
determine a subset of graphical display items, in a set of graphical display items stored in the one or more electronic storage devices, that have not previously been viewed by a user,
configure an initial display item to convey information about the set of graphical display items and to be displayed on a display device of a user computing device by an application executed by a processor of the user computing device;
randomly select a graphical display item from the subset of graphical display items not previously viewed by the user, the selected graphical display item configured to be displayed on the display device of the user computing device by the application,
in response to determining that the user computing device electronically transmitted a request for a web page, cause the network interface to transmit the initial display item to the user computing device via the communication network to be displayed within the web page, and
in response to the user selecting the initial display item when the initial display item is displayed on the display device, cause the network interface to transmit the selected graphical display item to the user computing device via the communication network,
wherein the graphical display item is at least one of:
(i) configured to be displayed within the web page,
(ii) configured to be displayed such that the graphical display item overlays at least a portion of the web page, and
(iii) configured to be displayed in a first web browser window separate from a second web browser window that displays the web page.

41. A computing system according to claim 40, wherein the one or more electronic storage devices store computer readable instructions that, when executed by the one or more processors, cause the one or more processors to:
determine the subset of graphical display items that have not previously been viewed by the user based on tracking information stored in the one or more electronic storage devices, and
in response to determining that the user selected the initial display item, update the tracking information stored in the one or more electronic storage devices to indicate that the selected graphical display item has been viewed by the user.

42. A computing system according to claim 41, wherein the one or more electronic storage devices store computer readable instructions that, when executed by the one or more processors, cause the one or more processors to update the tracking information stored in the one or more electronic storage devices in response to an indication that the user selected the initial display item, wherein the indication is received from the user computing device via the communication network.

43. A computing system according to claim 41, wherein the one or more electronic storage devices store computer readable instructions that, when executed by the one or more processors, cause the one or more processors to:
determine whether a graphical display item, from the set, that was previously viewed by the user should be selected,
select a graphical display item previously viewed by the user in response to determining that a graphical display item that was previously viewed by the user should be selected, and
select the graphical display item from the subset of graphical display items not previously viewed by the user is in response to determining that a graphical display item that was previously viewed by the user should not be selected.

44. A computing system according to claim 40, wherein the one or more electronic storage devices store computer readable instructions that, when executed by the one or more processors, cause the one or more processors to:
randomly select, based on tracking information stored in one or more electronic storage devices, from the subset of graphical display items a graphical display item not previously viewed by the user, and
update the tracking information stored in the one or more electronic storage devices to indicate that the selected graphical display item has been viewed by the user in response to determining that the user selected the initial display item.

45. A computing system according to claim 40, wherein the one or more electronic storage devices store computer readable instructions that, when executed by the one or more processors, cause the one or more processors to cause the network interface to transmit, via the communication network, a data object that includes (i) the initial display item and (ii) the selected graphical display item, wherein the data object is configured to be processed by the application executed by the processor of the user computing device.

46. A computing system according to claim 40, wherein the one or more electronic storage devices store computer readable instructions that, when executed by the one or more processors, cause the one or more processors to:
select an audio item from a set of audio items related to the set of graphical display items, wherein the set of audio items is stored in the one or more electronic storage devices;
cause the network interface to transmit, via the communication network, the selected audio item to the user computing device;
wherein the initial display item and the selected audio item are configured such that the selected audio item is rendered with an audio output device of the user computing device in response to the user selecting the initial display item when the initial display item is displayed on the display device.

47. A computing system according to claim 40, wherein the one or more electronic storage devices store computer readable instructions that, when executed by the one or more processors, cause the one or more processors to:
determine whether the user selects the initial display item when the initial display item is displayed on the display device; and
cause the selected graphical display item to be displayed on the display device of the user computing device by the application in response to determining that the user selected the initial display item.

48. A computing system according to claim 40, wherein the one or more electronic storage devices store computer readable instructions that, when executed by the one or more processors, cause the one or more processors to:
store tracking information, the tracking information indicating whether the graphical display item has been previously viewed by the user;
wherein the subset of graphical display items that have not previously been viewed by the user is determined based on the tracking information.

49. One or more first non-transitory electronic storage devices having stored thereon computer readable instructions that, when executed by one or more processors, cause the one or more processors to:
determine a subset of graphical display items, in a set of graphical display items stored in one or more second non-transitory electronic storage devices, that have not previously been viewed by a user,
configure an initial display item to convey information about the set of graphical display items and to be displayed on a display device of a user computing device by an application executed by a processor of the user computing device,
randomly select a graphical display item from the subset of graphical display items not previously viewed by the user, the selected graphical display item configured to be displayed on the display device of the user computing device by the application,
in response to determining that the user computing device electronically transmitted a request for a web page, cause a network interface of the computing system to electronically transmit, via a communication network, the initial display item to the user computing device to be displayed within the web page, and
in response to the user selecting the initial display item when the initial display item is displayed on the display device, cause the network interface of the computing system to electronically transmit, via the communication network, the selected graphical display item to the user computing device,
wherein the graphical display item is at least one of:
(i) configured to be displayed within the web page,
(ii) configured to be displayed such that the graphical display item overlays at least a portion of the web page, and
(iii) configured to be displayed in a first web browser window separate from a second web browser window that displays the web page.

50. The one or more first non-transitory electronic storage devices of claim 49 having stored thereon computer readable instructions that, when executed by the one or more processors, cause the one or more processors to:
determine the subset of graphical display items that have not previously been viewed by the user based on tracking information stored in the one or more second non-transitory electronic storage devices, and
in response to determining that the user selected the initial display item, update the tracking information stored in the one or more second non-transitory electronic storage devices to indicate that the selected graphical display item has been viewed by the user.

51. The one or more first non-transitory electronic storage devices of claim 50 having stored thereon computer readable instructions that, when executed by the one or more processors, cause the one or more processors to update the tracking information stored in the one or more second non-transitory electronic storage devices in response to an indication that the user selected the initial display item, wherein the indication is received from the user computing device via the communication network.

52. The one or more first non-transitory electronic storage devices of claim 50 having stored thereon computer readable instructions that, when executed by the one or more processors, cause the one or more processors to:
determine whether a graphical display item, from the set, that was previously viewed by the user should be selected,
select a graphical display item previously viewed by the user in response to determining that a graphical display item that was previously viewed by the user should be selected, and
select the graphical display item from the subset of graphical display items not previously viewed by the user is in response to determining that a graphical display item that was previously viewed by the user should not be selected.

53. The one or more first non-transitory electronic storage devices of claim 49 having stored thereon computer readable instructions that, when executed by the one or more processors, cause the one or more processors to:
randomly select, based on tracking information stored in one or more second non-transitory electronic storage devices, from the subset of graphical display items a graphical display item not previously viewed by the user, and
update the tracking information stored in the one or more second non-transitory electronic storage devices to indicate that the selected graphical display item has been viewed by the user in response to determining that the user selected the initial display item.

54. The one or more first non-transitory electronic storage devices of claim 49 having stored thereon computer readable instructions that, when executed by the one or more processors, cause the one or more processors to cause the network interface to transmit, via the communication network, a data object that includes (i) the initial display item and (ii) the selected graphical display item, wherein the data object is configured to be processed by the application executed by the processor of the user computing device.

55. The one or more first non-transitory electronic storage devices of claim 49 having stored thereon computer readable instructions that, when executed by the one or more processors, cause the one or more processors to:

select an audio item from a set of audio items related to the set of graphical display items, wherein the set of audio items is stored in the one or more second non-transitory electronic storage devices;

cause the network interface to transmit, via the communication network, the selected audio item to the user computing device;

wherein the initial display item and the selected audio item are configured such that the selected audio item is rendered with an audio output device of the user computing device in response to the user selecting the initial display item when the initial display item is displayed on the display device.

56. The one or more first non-transitory electronic storage devices of claim 49 having stored thereon computer readable instructions that, when executed by the one or more processors, cause the one or more processors to:

determine whether the user selects the initial display item when the initial display item is displayed on the display device; and cause the selected graphical display item to be displayed on the display device of the user computing device by the application in response to determining that the user selected the initial display item.

57. The one or more first non-transitory electronic storage devices of claim 49 having stored thereon computer readable instructions that, when executed by the one or more processors, cause the one or more processors to:

store tracking information, the tracking information indicating whether the graphical display item has been previously viewed by the user;

wherein the subset of graphical display items that have not previously been viewed by the user is determined based on the tracking information.

\* \* \* \* \*